United States Patent [19]

Rocco, Jr.

[11] Patent Number: 5,299,312
[45] Date of Patent: Mar. 29, 1994

[54] NETWORK FAULT RECOVERY BY CONTROLLABLE SWITCHING OF SUBNETWORKS

[75] Inventor: A. Gregory Rocco, Jr., Carlisle, Mass.

[73] Assignee: Massachusetts Institute of Technology, Cambridge, Mass.

[21] Appl. No.: 613,400

[22] Filed: Nov. 15, 1990

[51] Int. Cl.⁵ ............... H04L 12/24; H04L 12/26; H04L 12/28; H04L 12/46
[52] U.S. Cl. ........................ 395/200; 364/200; 364/DIG. 1; 364/242.95; 364/265.1; 364/266.5; 370/13; 370/16.1; 370/85.5; 371/11.2
[58] Field of Search ............. 371/11.2, 11.3, 13, 371/20.6; 370/16, 16.1, 85.14, 85.13, 85.55, 13; 395/200, 575, 275

[56] References Cited

U.S. PATENT DOCUMENTS

| | | | |
|---|---|---|---|
| Re. 33,426 | 11/1990 | Sugimoto et al. | 370/85.14 |
| 4,590,468 | 5/1986 | Stieglitz | 340/825.5 |
| 4,593,280 | 6/1986 | Grow | 370/85.5 |
| 4,763,254 | 9/1988 | Mori et al. | 395/200 |
| 4,779,261 | 10/1988 | Yamagishi et al. | 370/16 |
| 4,860,284 | 8/1989 | Brown et al. | 370/85.5 |
| 4,899,142 | 2/1990 | Nakayashiki et al. | 340/825.05 |
| 4,928,279 | 5/1990 | Muroi | 371/11.2 |
| 4,985,888 | 1/1991 | Madge et al. | 370/85.5 |
| 4,999,832 | 3/1991 | Chen et al. | 370/85.14 |
| 5,012,120 | 4/1991 | Minagawa et al. | 307/35 |
| 5,079,765 | 1/1992 | Nakamura | 370/85.13 |
| 5,132,962 | 7/1992 | Hobgood et al. | 370/16.1 |
| 5,136,580 | 8/1992 | Videlock et al. | 370/60 |
| 5,146,452 | 9/1992 | Pekarske | 370/16 |
| 5,150,356 | 9/1992 | Tsutsui et al. | 371/11.2 |
| 5,200,949 | 4/1993 | Kobayashi | 370/16 |
| 5,229,988 | 7/1993 | Marbaker et al. | 370/13 |

OTHER PUBLICATIONS

"Architecture and Design Considerations for a Reliable Token-Ring Network" by Bux, W., et al., (1984), pp. 15–25.

"Fault Tolerance Increasing in Token Ring Lans" by Casale, S., et al., (1988), pp. 446–452.

"Reliability Mechanisms of the FDDI High Bandwidth Token Ring Protocol" by Marjory J. Johnson, (1986), pp. 121–131.

*Primary Examiner*—Arthur G. Evans
*Assistant Examiner*—Lance L. Barry
*Attorney, Agent, or Firm*—Hamilton, Brook, Smith & Reynolds

[57] ABSTRACT

A subring module for controlling the switching of a subring in and out of the main network of a token passing ring has a data detection circuit for detecting a token on the network. The subring module switches between two switch positions in response to an internal state machine. The first switch position incorporates the subring into the main network, and the second switch position isolates the subring from main network. The subring module has a state machine which responds to the detection of the token on the network to switch the subring out of the network when the network is down, and to switch the subring back into the network when both the subring and the main network are up again. When a number of subrings are present, each subring has its own module and state machine control. When the network goes down, the subrings switch out at different times depending on a hierarchial priority given to the subrings. The switching of the subrings back into the network is also controlled relative to a hierarchical priority. Thus, splitting and recombining of subrings of the the token passing ring can be arranged to proceed in any desired manner. The end result is that a defective subring is automatically isolated.

25 Claims, 14 Drawing Sheets

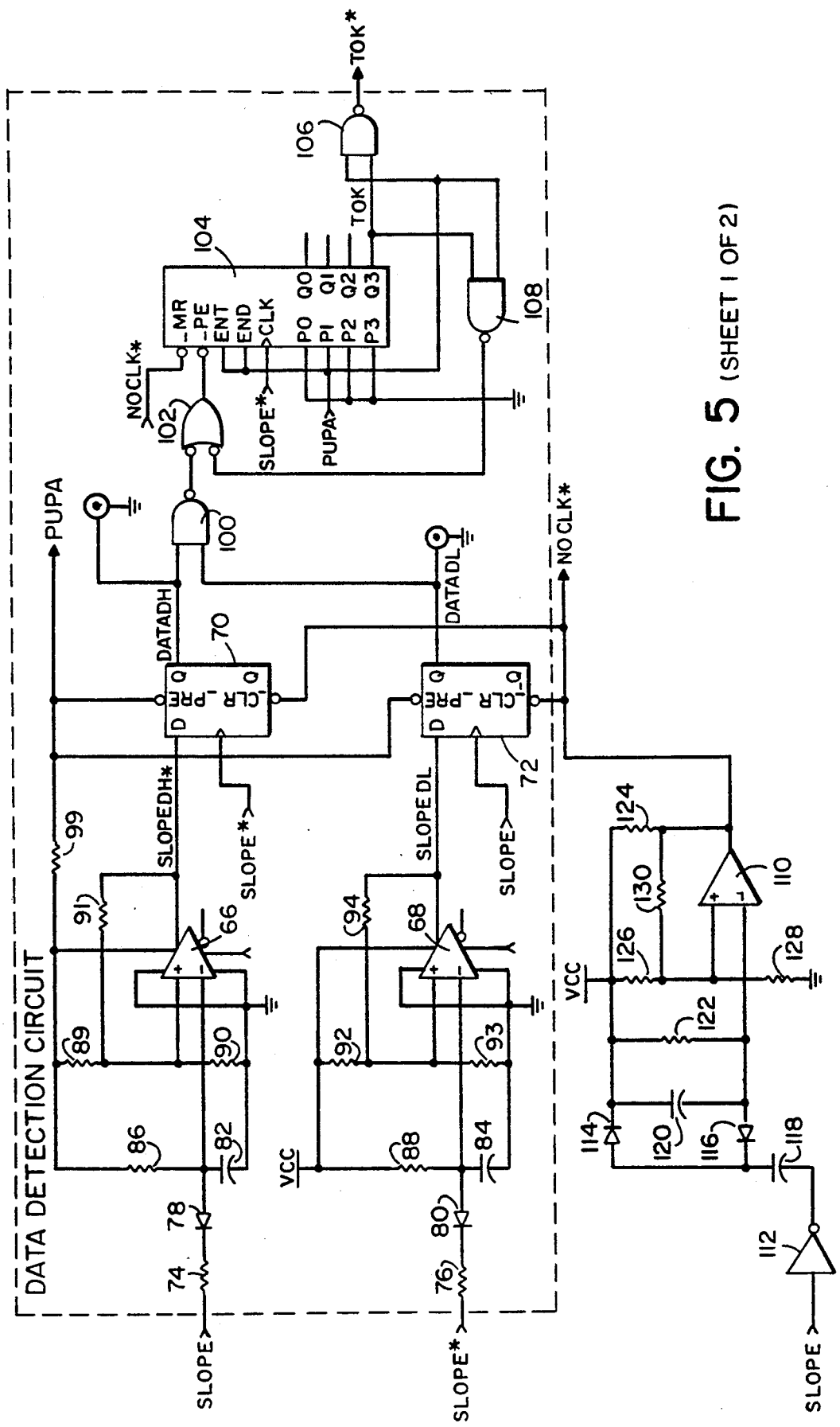
FIG. 5 (SHEET 1 OF 2)

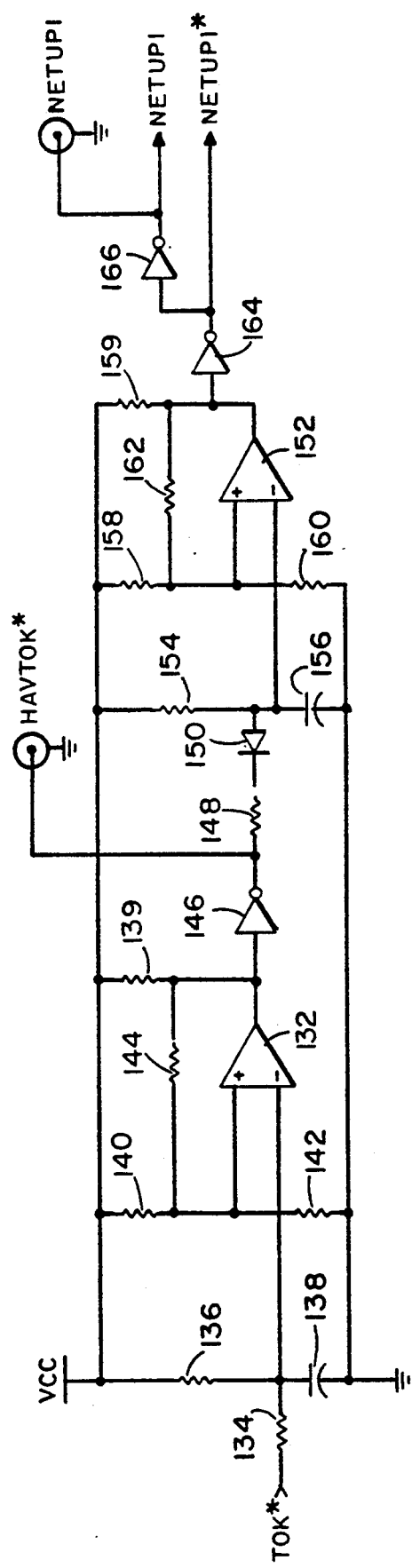
FIG. 5 (SHEET 2 OF 2)

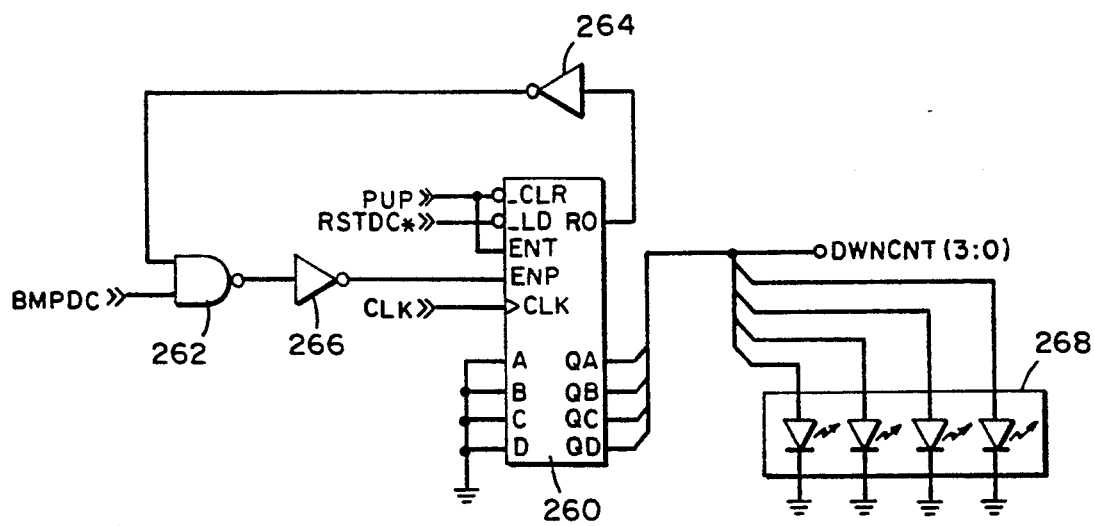
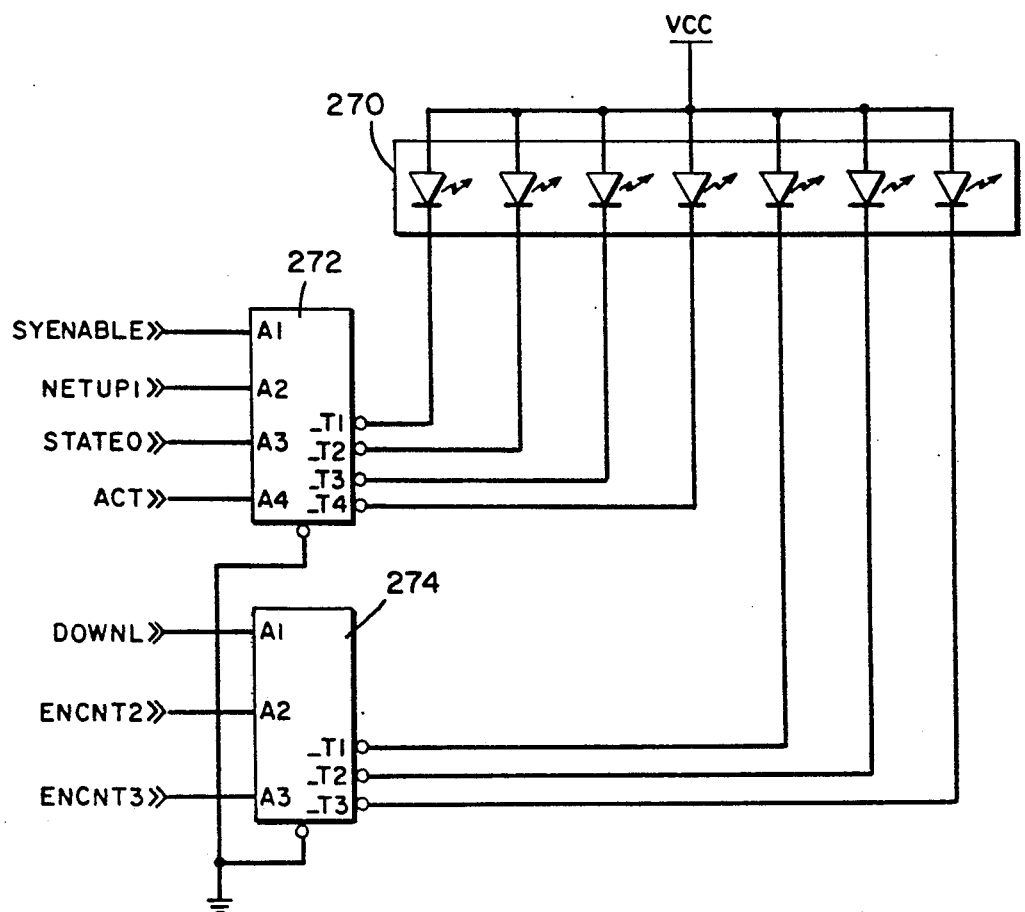
FIG. 10

NETWORK FAULT RECOVERY BY CONTROLLABLE SWITCHING OF SUBNETWORKS

This invention was made with government support under contract Number F19628-85-C-0002 awarded by the Department of the Air Force. The government has certain rights in the invention.

BACKGROUND OF THE INVENTION

1. Field of the Invention

The invention relates to fault detection and recovery in networks including token-passing ring networks.

2. Description of Related Art

A token passing ring is a means for interconnecting a network of computer systems. The computer machines are connected in series, with the output of one machine feeding the input to the next. Each machine represents a communication node of the system, and a network is created in the form of a unidirectional communications ring. Any node may originate a message, which is then passed from one node to the next until it arrives at its destination node. Normally, if the ring is broken anywhere, the ring goes down and the machines on the ring can no longer communicate with each other.

In installations of more than a few nodes, the ring is typically divided into subrings. These subrings are connected together at one or more central locations. At these central locations there are manual switches that allow each subring to be switched in and out of the network. Large networks may have a hierarchy where subrings themselves are divided into smaller subrings. When the network becomes broken, an operator must switch the malfunctioning subrings off the main network. This restores service to all the machines except those on the malfunctioning subring.

When the ring is operating, a token (a message used to control access to the network) is passed around the ring from node to node. Only the node which has possession of the token may initiate communication. However, a network failure can cause the token to be lost and thereby create a disruption for network users. It takes time to find out that the network is down, locate the malfunctioning subring, and then flip the appropriate switch.

It is not uncommon for users to run jobs overnight and in some cases jobs that take several days. If the network fails and is down for an extended period of time, the communication lapse between nodes working together could cause one of these jobs to abort. This is very undesirable, since the job will usually have to be started over again.

SUMMARY OF THE INVENTION

A token passing ring of the present invention has a main network providing a serial communication path to a plurality of communication nodes. A subring also provides a serial communication path to a plurality of communication nodes. A subring module provides a switchable communication link between the subring and the main network. In a first switch position, the subring module incorporates the communication path of the subring into the communication path of the main network. In a second switch position, the subring module closes the communication paths of the subring and the network on themselves and isolates the communication path of the subring from the communication path of the main network. Thus, while the switch is in the second position, the subring module completes the serial communication path of both the network and the subring such that each is an independent communication ring.

For controlling the switching of the subring module, a controller with a data detection circuit is provided which detects communication signals reaching the subring module. In a preferred embodiment, the data detection circuit specifically detects tokens used in controlling traffic on the token passing ring. The data detection circuit controls the subring module to switch the subring module from the first switch position to the second switch position if a required lower threshold frequency of tokens are not detected for a first selectable period of time. The data detection circuit also controls the subring module to switch the subring module from the second switch position to the first switch position after a second selectable period of time if a required upper threshold frequency of tokens are detected on the subring. With the data detection circuit of the controller detecting signals on the subring, the presence of the required upper threshold frequency of tokens indicates that the subring is not faulty and can be switched back into the network.

In the preferred embodiment, the first switch position of the subring module connects an input port of the subring to an output port of the main network, while connecting an input port of the main network to an output port of the subring. Similarly, the second switch position of the subring connects an input port of the subring to an output port of the subring, while connecting an input port of the main network to an output port of the main network. The controller has a state machine which follows a preset program for controlling switching of the subring module in response to communication signals detected. The bulk of the state machine is implemented using a programmable array logic (PAL) element.

In the preferred embodiment, a plurality of subrings are provided, each having a subring module linking it to the main network. Each of the subring modules has a controller with a data detection circuit which detects communication signals of that subring module and generates a control signal for controlling the switching of the subring module. Using selectable time periods, each subring is given switching priorities. Thus, different subrings switch out of the network at different times after tokens are no longer detected at the required frequency. Since usually any machine on a ring can generate a token, some subrings may never switch out. For example, if a faulty subring is switched out by a subring module with an early switching priority, tokens may be generated soon enough to prevent a subring module with a later switching priority from switching out. The controller of the later priority module receives the tokens before its relatively long "switch-out" time expires, and that subring module then keeps its subring on the network.

The second selectable time period controls priority for the switching in of subrings. A secondary subring which is a subring of a primary subring is switched back into the primary subring before the first subring is switched back into the network. Thus, a faulty secondary subring will not cause failure beyond the primary subring when it is switched back into the primary. If the primary subring is not faulty, machines on the secondary subring are able to communicate with other nodes of the primary subring while a fault is isolated elsewhere on the network.

An optical fiber link may also be included with the preferred embodiment, the link being positioned between the subring and communication nodes on the main network. A signal converter between the subring and the optical fiber link converts between optical and electrical signals.

In addition, a display is provided to display the switch position of the subring module to a system user. A manual switch allows manual control of the switch position of the subring module. The manual switch overrides the switching of the subring module by the control signal.

BRIEF DESCRIPTION OF THE DRAWINGS

FIG. 5 shows a circuit using the output of the slope detection circuit of FIG. 4 to detect a token on the network.

FIG. 10 shows the down counter of the present invention and several LED display circuits.

DETAILED DESCRIPTION OF A PREFERRED EMBODIMENT

Figure 1:
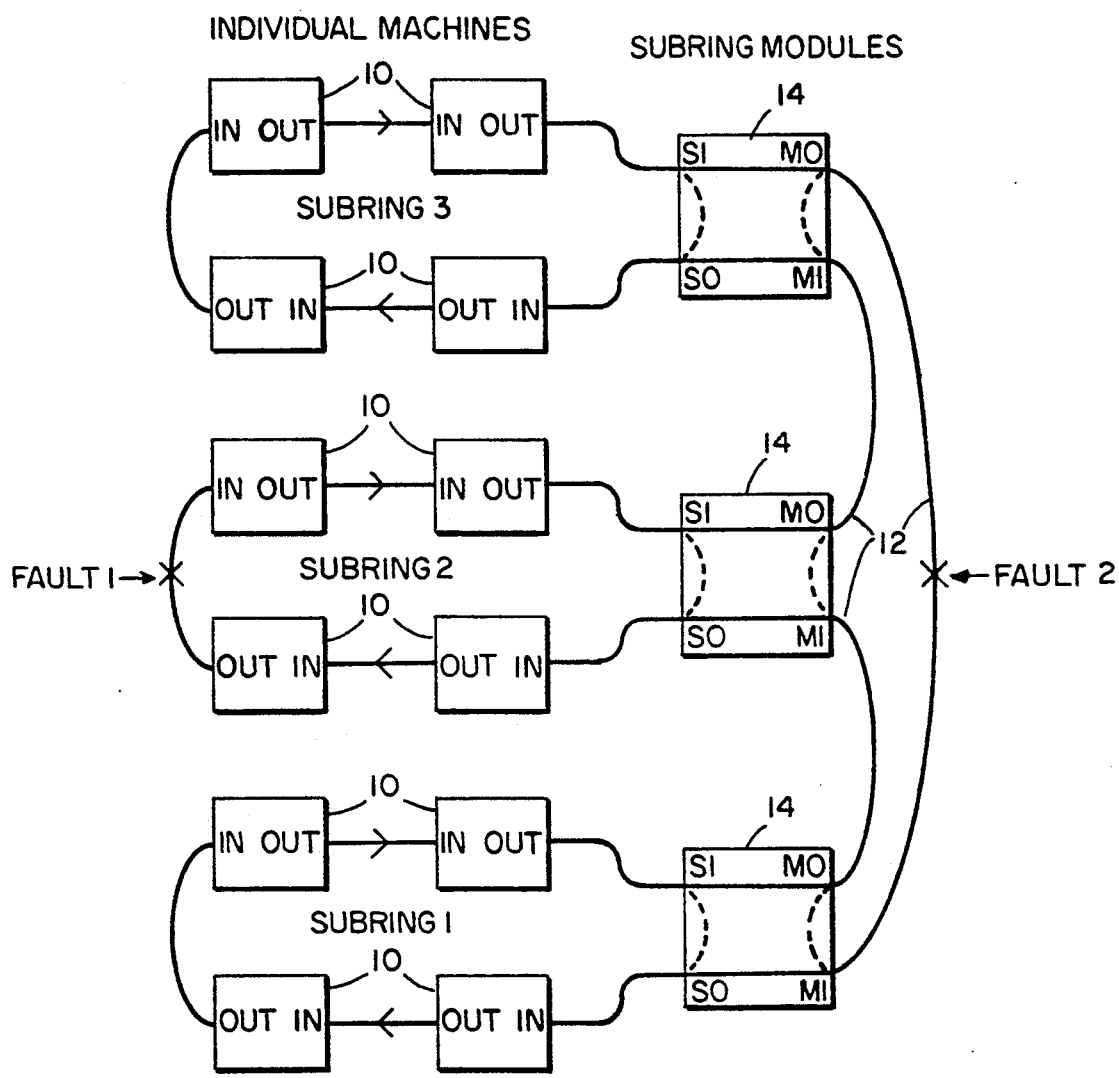
FIG. 1 shows a typical token passing ring having three subrings.

An illustration of a typical token passing ring having three subrings is shown in FIG. 1. In the figure, each subring is shown having four communication nodes at which individual machines 10 are connected to the subring. A network is created with all three subrings by external connections 12 which form a serial link between the subrings.

Shown connecting each subring to the network is a subring module 14 which controls the switching of the subring relative to the network such that the subring may be switched onto or off of the network. Each module has the following four ports:
SI—Subring In—input from subring
SO—Subring Out—output to subring
MI—Main net In—input from main network
MO—Main net Out—output to main network
By controlling interconnection of these ports, a subring module controls whether its subring is on or off the network.

The two switching positions of a subring module 14 are indicated in FIG. 1 by the solid and dashed lines within the module, which show internal communication paths of the module. When a module 14 switches a subring into the network, the connections within the module are as shown by the solid lines within the module. In this configuration, the subring module establishes a series connection of the subring with the network. Thus, a token on the network passes into the module 14 through port MI, and then out to the subring through port SO. The token then passes through the subring from node to node, being received and regenerate by each individual machine. Upon exiting the last node, the token then reenters the module 14 through port SI and passes back onto the network via port MO. In this manner, access to the network is provided to the machines on the subring by providing control of the token. In addition, any data being communicated to machines on other subrings may also pass through the module and onto the network through the subring module 14.

The second switching position of a subring module 14 is shown by the dashed lines and indicates when a subring is off the network. When a subring is switched off the network, the communication paths from port SI to MO and from port MI to SO are disabled, and the dashed line connections are enabled. Thus, the data coming into port SI is routed directly to port SO, and data coming into port MI is routed directly to port MO. This arrangement of connections thereby completes the serial connection of both the subring which was switched off, and the remainder of the network The network functions normally as long as all communication paths of the network allow the passage of data. Since the external network connections 12 and any subrings switched onto the network form one large ring of communication nodes in series, a token, or any other data on the network passes from node to node around the ring. However, when there is a break in the network connection due to some fault on the ring, the network goes down, and the token is usually lost. In order to prevent jobs being run on the network from being aborted, it is necessary to bring the network up again as fast as possible. When the network goes down and the token is lost, machines on the network generate new tokens and insert them on the network. If the fault which occured in the ring is isolated, and a subring which might contain the fault is switched out fast enough, communication between machines on the rest of the network may be reestablished before important jobs are aborted.

To properly reestablish communication between as much of the network as possible requires accurate control of the subring modules 14. In order to provide this control, each module 14 is provided with a state machine which controls the switching of the associated subring on and off the network. A state machine is a device (in the present embodiment, a digital hardware device) that remains in a particular state until certain conditions cause it to change. Each state machine responds to a clock module which initiates each action with a clock tick. Several subring modules may be located within a single local chassis, and may therfore be driven by the same clock module. Other more remote subring modules use other clock modules. However, the system is structured such that if the different state machines are within one tick of each other, no problems with synchronization arise. In the preferred embodiment, the logic of the state machines respond to voltage changes (i.e., rising or falling edges of a clock). With the clock circuitry, a pulse consisting of a rising edge followed by a falling edge is referred to as a clock "tick". These clock ticks govern the response of the digital logic circuitry.

In the present embodiment, the particular structure and control of the state machines, and the timing by the clock module are implemented for use with a Hewlett Packard HP-Apollo Computer token passing ring. However, it will be recognized by one skilled in the art that the contents of this disclosure are easily adaptable to use with other token passing networks as well.

Each subring has a subring module 14 associated with it which is controlled by a state machine. If the network goes down, the subrings also go down. When this occurs, each module switches its subring off the network and waits to see if the subring comes back up. Since after a period of time, an individual machine which is waiting for the token generates a new token, the subring should come back up after being switched out, assuming the fault which brought the network down is not on that subring. The state machine of each module monitors the subring for a token to determine whether or not the subring is up and operating. Once the subring is back up (i.e. the machines on that subring have a new token and can communicate with one another), the module 14 associated with that subring switches the subring back onto the network. If a subring has a fault and does not come back up on its own, that subring is not switched back into the network. However, since the other subrings are reconnected to the network, communications between machines which are not on the faulty subring can proceed.

The above situation results when a fault occurs within a particular subring. Fault 1 indicated in FIG. 1 is an example of such a situation. The break in the network due to fault 1 is within a single subring (subring 2), and although that break brings the entire network down, all the subrings are switched out and all but subring 2 are switched back quickly enough so that jobs being run on either subring 1 or 3 which are accessing files on their own subrings will not abort. Any jobs running on subrings 1 or 3 and accessing files on the other subring may abort if they try to access a file on the other subring during the short period of time that either subring is switched out of the main network. For example, if a job running on subring 1 tries to access a file on subring 3 during the short time that subring 3 is up but off the main network, the job may abort. In an HP-Apollo environment, when the network goes down, a machine waits 25-60 seconds before giving up trying to get data from a remote node. Therefore, for the present embodiment, it is necessary that subrings are isolated and allowed to come back up as subrings within about 20 seconds.

A second situation occurs when a fault occurs in the network which is not within a particular subring. If a break occurs in the main network, or if a particular subring fails to switch out, it is desirable to have all the subrings switch out and remain switched out. Then, when a non-faulty subring comes back up, the machines on that subring can continue transmitting data to each other. An example of this type of fault is shown in FIG. 1 as fault 2. Fault 2 is a break in one of the external connections 12 of the main network. This break causes the network to go down, and all subrings switch out. However, when a subring tries to switch back onto the network, the fault may still exist and bring the subring down again. Therefore, a subring module 14 automatically keeps its subring off the network if it finds that the network goes down and stays down when it tries to switch back in. It will then stay off the network for several minutes before it tries to switch in again.

The handling of the different types of faults which may occur in the network requires each subring module to follow a specific sequence of steps, as controlled by the state machine of that module. Each state machine has eight different possible states, state 0 being normal operation. The following are definitions of terms used in describing the state machines:

Active—A subring module is active if its relays are in the "non-split" position such that the subring is switched into the network.

CNT2N—CNT2N is the number of clock pulses or "ticks" for which the state machine remains in state 2 before attempting to switch the subring back into the network. CNT2N can be any number between 2 and 256.

CNT3N—CNT3N is the number of ticks for which the state machine remains in state 8 before attempting to switch the subring back into the network. CNT3N can be any number equal to ($N \times 256$), where N is an integer from 1 to 16.

Down counter—The down counter of a state machine counts the number of times a fault occurs that causes its subring to remain switched out of the network. A flag is set when the counter has been incremented. The flag is cleared when state 0 is entered.

DOWNL—The signal DOWNL is an input to the state machine. If true, the network has been down for several clock ticks and is still down. The number of ticks during which a token is not received necessary to make DOWNL true can be set from 1 to 15.

DOWNLN—DOWNLN is the number of clock ticks that the network must be down in order for DOWNL to become true.

Each state machine can be described as following the same program steps with regard to the above definitions. The state machines of different subrings are given different parameters by changing the values CNT2N, CNT3N, and the number of ticks that sets DOWNL to true.

Figure 2:
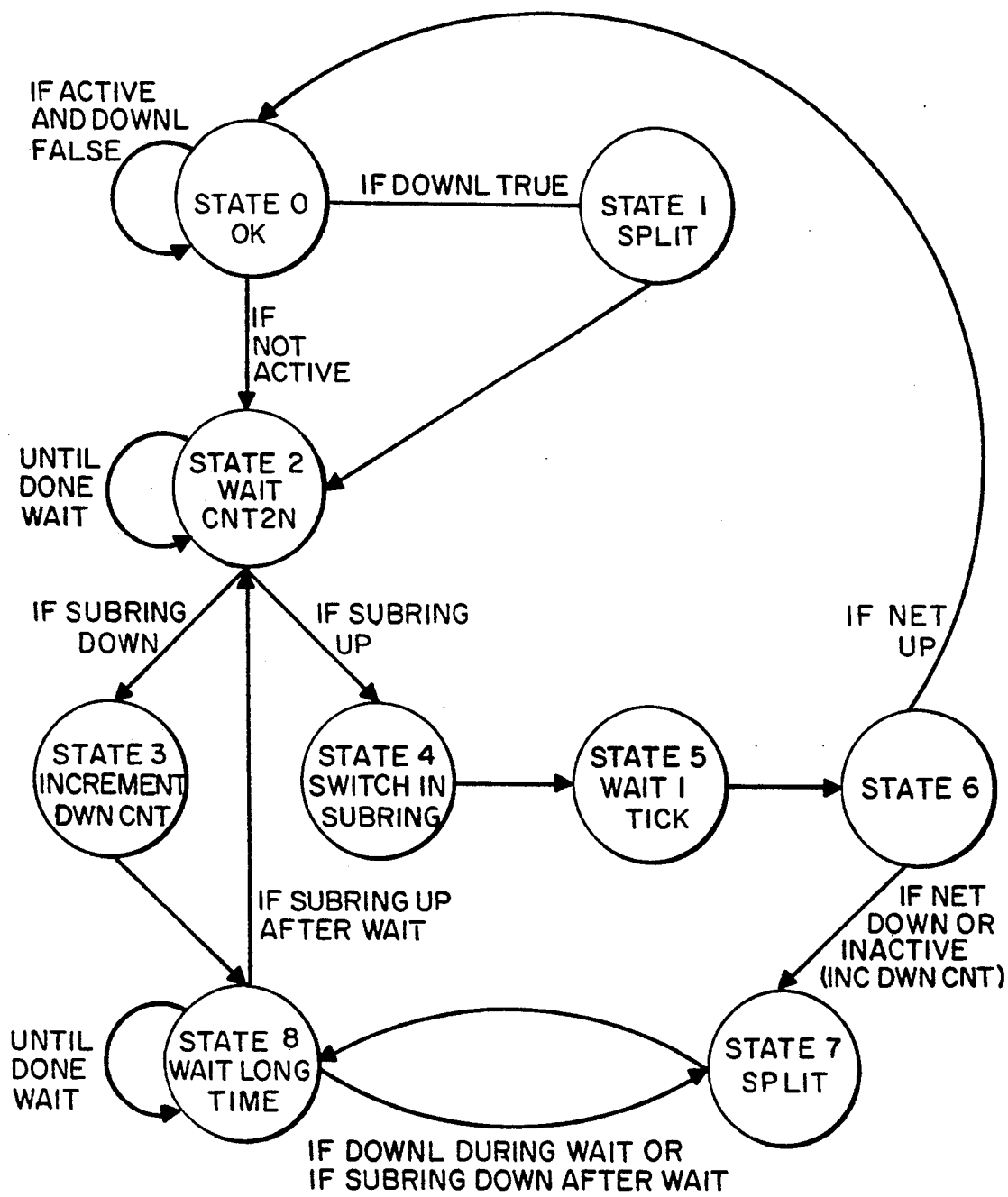
FIG. 2 is a state diagram showing the operation of a subring module state machine according to the present invention.

The state diagram of FIG. 2 shows the different states of a state machine. These different states of a state machine controlling a particular subring may be described as follows:

State 0: The network is up and operating normally. The subring is on the network. The flag indicating that the down counter has been incremented is cleared. If DOWNL is true, go to state 1. If DOWNL is not true and the network is not active, go to state 2. Otherwise, remain in state 0.

State 1: The subring is "split off" (switched off) the network. Go to state 2.

State 2: Wait CNT2N ticks to allow subring to come back up. After waiting, go to State 3 if the subring is down. Otherwise, go to State 4.

State 3: Increment the down counter if the flag indicates that it has not already been incremented, and set the flag. Go to State 8.

State 4: Switch the subring back onto the network. Go to State 5.

State 5: Wait for 1 tick and go to State 6. This gives the subring and the network time to come back up if the token is lost while reconnecting the subring.

State 6: If the network is up, go to State 0. If the network is down or inactive and the down counter has not been incremented, increment the down counter and set the flag indicating that it has been incremented. If the network is down or inactive, go to State 7.

State 7: Split the subring off the network. Go to State 8.

State 8: Wait CNT3N ticks (usually several minutes). If DOWNL is true during waiting period, go immediately to State 7. After waiting, if the subring is up go to State 2; if the subring is down go to State 7.

The foregoing is a general description of the logic controlling the changing of states in a subring state machine according to a preferred embodiment of the invention. The following examples demonstrate how a state machine controls the subring module in the event of different faults occuring in the network, and in particular those faults shown in FIG. 1. In the examples, CNT2N=2, CNT3N=256, and DOWNLN=6. The time is shown in clock ticks, and the numbers enclosed in parentheses indicate which state the subring module in question is in.

Example 1 shows the response of the state machines of the subrings of FIG. 1 to fault 1 which occurs within subring 2.

EXAMPLE 1

| Time | Action |
|---|---|
| 0 | Shortly after tick 0, a cable break in subring 2 brings the network down. |
| 7 | All three subrings split off the network (1). |
| 8 | All three subrings wait CNT2N (2). Subrings 1 and 3 come up OK as subrings. |
| 10 | Subrings 1 and 3 switch into the network (4). The subring 2 down counter is incremented (3). |
| 11 | Subrings 1 and 3 wait 1 tick (5). Subring 2 waits (8). |
| 12 | Subrings 1 and 3 check network to see if it is up (6). Subring 2 waits (7) (DOWNL=true). |
| 13 | Subrings 1 and 3 are up and connected to the network (0). Subring 2 waits (8). |
| 14 | Subring 2 continues alternating between states 7 and 8. |
| 16 | The fault is repaired. Subring 2 is in state 7. |
| 17 | Subring 2 waits CNT3N (8) (DOWNL=false). |
| 273 | Subring 2 waits CNT2N (2). |
| 275 | Subring 2 switches back in, bringing all subrings down briefly (4). |
| 276 | Subring 2 waits 1 tick (5) (subrings 1 and 3 stay in state 0). |
| 277 | Entire network is back up (6). |
| 278 | All three subrings back to normal (0). |

In the above example, since DOWNLN is the same for each subring module, a fault occurring within a subring causes the three subrings to split off the network at the same time. And although the entire network (all three subrings) is not back up until the fault is repaired, the non-faulty subrings are back up at time 8, and are back on the network at time 13. In the preferred embodiment, the clock ticks are each about 2 seconds. Therefore, the state machine control of the subring modules in the above example has the non-faulty subrings back up in about 16 seconds after the break, and back on the main network at about 26 seconds after the break.

The next example shows how fault 2 of FIG. 1 is handled by the present subring strategy.

EXAMPLE 2

| Time | Action |
|---|---|
| 0 | Shortly after tick 0, a single break outside subrings brings the network down. |
| 7 | All three subrings split off the network (1). |
| 8 | All three subrings wait CNT2N (2). All three come back up OK as subrings. |
| 10 | All three subrings are switched back onto the network (4), bringing them down again. |
| 11 | All three subrings wait 1 tick (5). |
| 12 | All three subrings find the network down, and each increments its down counter (6). |
| 13 | All three subrings switch off the network. Each comes up OK as a subring (7). |
| 14 | All three subrings wait CNT3N (8). |
| 270 | All three subrings wait CNT2N (2). |
| 272 | All three subrings switch back onto the network (4), bringing them down again. |
| 273 | All three subrings wait 1 tick (5). |
| 274 | All three subrings find that the network is still down (6). |
| 275 | All three subrings switch off the network, and come up OK as subrings (7). |
| 276 | all three subrings wait CNT3N ticks (8). |
| 303 | Broken cable is fixed. |
| 532 | All three subrings wait CNT2N ticks (2). |
| 534 | All three subrings are switched onto the main network (4). |
| 535 | All three subrings wait 1 tick (5). |
| 536 | All three subrings find the network up (6). |
| 537 | All three subrings back to normal as a single network (0). |

The above Example 2 shows that the break in the interconnections 12 between the subrings of FIG. 1 prevents any further communication between the subrings until the break is fixed. However, the state machine strategy of the present invention allowed the subrings to come back up as subrings within 8 ticks (16 seconds), so that communications between machines on the same subring were not fatally disrupted. The long count of CNT3N allows the subrings to operate within themselves, while still attempting to reestablish the main network every several minutes. In the present embodiment, CNT3N=256, so the waiting period of State 8 is about 512 seconds, or 8 min., 32 sec. Therefore, once the break is fixed, the main network is back up within this waiting period.

It is desirable in some applications to have the subrings switch out of the network at different times. Having different times for switching out allows a hierarchical arrangement to be established between the different subrings such that the network can divide up into larger pieces than if all the subring modules switched their subrings out at the same time. If a fault which brings the network down is isolated when the first set of subring modules take their subrings off the network, it is unnecessary for the remaining subring modules to take their subrings off the network.

Figure 3:
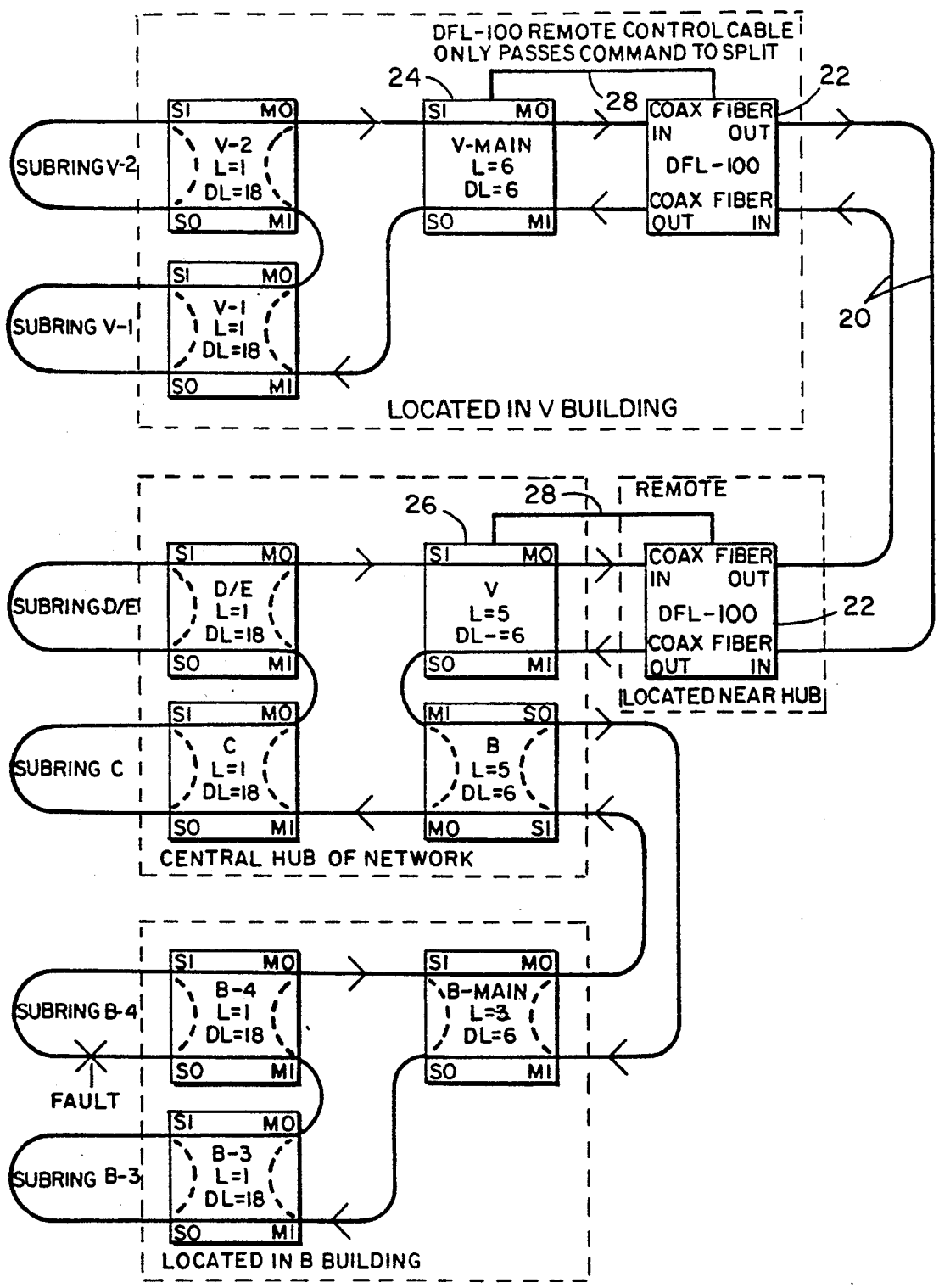
FIG. 3 shows a token passing ring having a number of subrings and subring modules of different hierarchy.

The order in which different subrings switch off the network is determined by the value of DOWNLN, the number of ticks allowed to each subring (while tokens are not being detected at the required frequency) before DOWNL=true. In FIG. 3, each subring is allowed either 6 or 10 ticks before setting DOWNL=true (i.e. DL=6 or DL=10). Thus, the subrings having a higher value for DL must wait longer before passing from State 0 to State 1, and therefore wait longer before splitting off the network. If the fault is in one of the lower priority subrings having a lower value, the higher priority subrings will never leave state 0 and then never switch out of the network. For the network of FIG. 3, the subrings having DL=10 split off the network 4 ticks later than those with DL=6.

Subrings can also be given different switching priorities for switching into the network if each subring has a different time after which it switches into the network.

These different times can be controlled by providing the state machine of each subring with a different value for CNT2N. When the network goes down, all the subring switch off the network according to their value for DOWNLN. However, with each having a different CNT2N, each subring waits in State 2 for a different length of time. As the subrings switch back in one at a time, they are each tested by whether or not they bring the network down for more time than is usual when switching in a non-faulty subring. If the network comes back up quickly after the subring is switched in, the subring is determined to be functioning normally and stays on the network in state 0. However, if the subring brings the network down for more than the two clock ticks of states 5 and 6 while switching in, the subring is switched out again in State 7 and waits in State 8 before attempting to switch in again.

The order in which subrings switch back into the network from state 2 is determined by the level of hierarchy L. The level L of hierarchy given to each subring corresponds to the value given to CNT2N in accordance with the following equation $$CNT2N = 7(L-1) + 2$$

Thus, the higher the level of hierarchy L is for a particular subring, the longer time it waits before attempting to switch back onto the network in State 4.

As demonstrated by FIG. 3 and Example 3, below, a fiber optic link is used in some network applications to connect subrings on the network. In the HP-Apollo environment of the present embodiment, fiber optic links can be implemented using an HP-Apollo DFL-100 interface 22 at both ends of the optical link. The DFL-100 22 converts between the optical signal and an electrical signal for use on coaxial cable. Therefore, there is one DFL-100 22 at each end of the fiber optic link which connects the subring to the network. When using such a fiber optic interface, a subring can be taken off or put back into the network by issuing a command to either of the two DFL-100s controlling the fiber link.

An example of a subring being connected to a network with DFL-100 fiber optic links is shown in FIG. 3. As shown in the figure, each DFL-100 has a coaxial input, a coaxial output, a fiber input, and a fiber output. Subring V is remote from the rest of the main network and is connected via fiber optic cables 20. One DFL-100 interface 22 is located at each end of the fiber connections. A subring module is positioned at each end, module V-main 24 serving subring V, and module V 26 providing connection to the rest of the network. Each of these modules 24, 26 has a remote control cable 28 through which commands can be sent to its respective interface 22. Using these connections, modules 24 and 26 are used to control the DFL-100's, telling them when to switch the optical link off the network. As configured in this example, only module 26 can switch the optical link back into the network. When either DFL-100 switches, the one at the other end of the fiber switches also. Since the modules 24 and 26 are controlling the network switches within the DLF-100, their own internal switches are disabled. This is demonstrated in FIG. 3 by the absence of the lines representing internal connections of the modules 24,26.

Except for the DFL-100 optical links 22, each of the blocks in FIG. 3 represents a subring module according to the present invention. Each of these blocks contains three lines of text which provide information about the subring module it represents. The top line is a label given to that particular subring, the second line shows the level of hierarchy given to the subring, and the third line shows the number of ticks which pass for that subring before DOWNL=true. For simplification, nodes within each subring are not shown.

As shown in FIG. 3, different subrings of the network are located in different buildings, as is often the case with actual large networks. In order to provide controlled isolation of faults occuring in the network, the configuration of the subrings in FIG. 3 is arranged such that different subrings switch on and off the network at different times. Since some subrings are a nested communication path of another subring, this allows communication between "subrings of a subring" to persist after the network is down, assuming the fault which occurs is not within that group of subrings. In the case of FIG. 3, each building has a single subring which contains other subrings located together in that building.

To demonstrate the hierarchical considerations of the subring modules, the following example shows the series of events which take place after the fault shown in FIG. 3 occurs.

EXAMPLE 3

| Time | Action |
|---|---|
| 0 | Shortly after tick 0, fault occurs, bringing the entire net down. |
| 7 | All subrings with DL=6 (V-main, V, B, and B-main) split off the network (1). The network is now divided into three parts: 1) V-1 and V-2; 2) D/E and C; and 3) B-3 and B-4. V-1 and V-2, and D/E and C come back up within a few seconds. |
| 11 | Subrings B-3 and B-4 split off the network (1). (Other subrings with DL=10 now see network as being up) |
| 14 | Subring B-3 switches back in (4). Subring B-4 increments down counter (3). |
| 15 | Subring B-4 alternates between States 7 and 8 until fault is fixed. |
| 17 | Subring B-3 has returned to State 0. |
| 24 | Subring module B-main (L=3) switches back in (4). |
| 27 | Subring module B-main has returned to State 0. |
| 31 | Subring module B (L=4) switches back in (4). |
| 34 | Subring module B has returned to State 0. |
| 38 | Subring module V (L=5) switches the DFL-100 optical link back in to provide communication between subring modules V and V-main. The entire network is now reestablished except for subring B-4 which is isolated. |
| 41 | Subring module V has returned to State 0. |
| 45 | Subring module V-Main is in state 4 (does not affect state of DFL-100) |
| 48 | Subring module V-main has returned to State 0 |

In the above example, the network is divided within 7 ticks. Assuming 2 seconds per tick, plus an extra second or so for the network to recover, only about 15 seconds pass before the higher level subrings allow internal communication between the lower level subrings within them. For an HP-Apollo network, this is fast enough to prevent jobs running on the lower level subrings, accessing files on other lower level subrings within the same higher level subring (like the subring composed of V-1 and V-2) from aborting, assuming they are not on the higher level subring with the fault. The entire network is reconfigured in about 76 seconds, leaving the subring with the fault isolated from the rest of the network. Jobs which are accessing files on the other higher level subrings may abort if they try to access files during the short time that they are isolated from the subring they are trying to access.

As shown in FIG. 3 and Example 3, no subring module is given a return hierarchy level L of 2. This is because Level 1 subring modules for which DL=10 enter State 2 four ticks later than those having DL=6. Since those with DL=10 enter State 2 later, they try to switch in their subrings at about t=14. A subring module with L=2, would enter State 2 after 6 ticks, and try to switch in sometime shortly after the switching in of the level 1 subring. These two switching times would be too close together, and would therefore cause conflict between the two levels of hierarchy.

Figure 4:
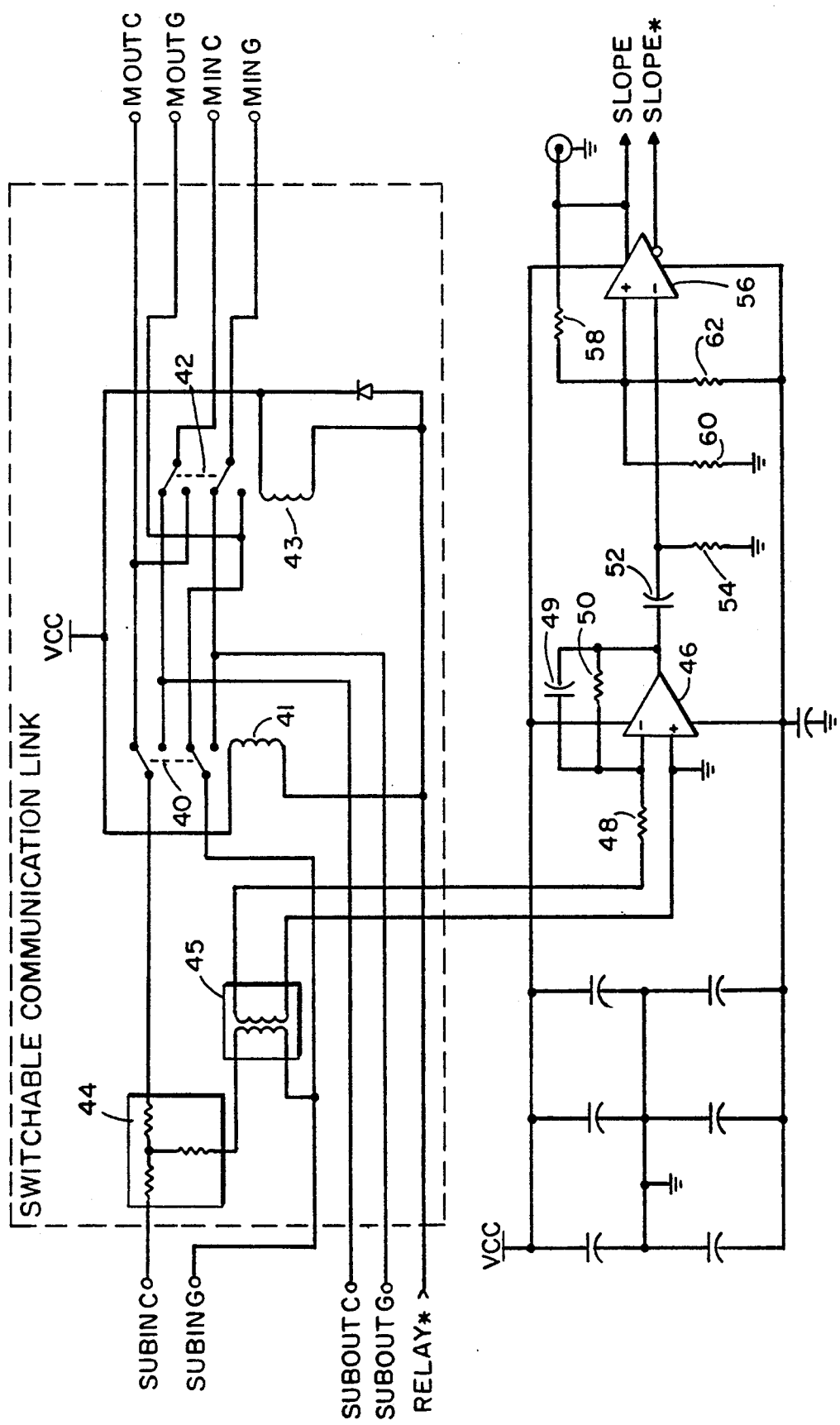
FIG. 4 shows the switching portion of a subring module and a slope detection circuit.

The implementation of a preferred embodiment of the present invention is shown schematically starting with FIG. 4. Each of the input and output ports of the subring side and the main network side of a subring module is shown as a signal input and a ground. The suffixes C (center) and G (ground) are used to designate signal lines and ground lines, respectively. Therefore, ports SI, SO, MO, and MI correspond to signals SUBINC/SUBING, SUBOUTC/ SUBOUTG, MOUTC/MOUTG, and MINC/MING, respectively. The switching in and out of the subring module is controlled by switches 40, 42, each of which is a double pole/double throw relay. In FIG. 4, switches 40, 42 are shown in the "switched-in" position. In this position, the SI signal lines connect to the MO lines, and the SO signal lines connect to the MI lines. With switches 40, 42 in the other position, the SI signal lines connect to the SO lines, and the MO signal lines connect to the MI lines.

The position of the switches 40, 42 is controlled by signal RELAY*, which serves to energize relay coils 41, 43 simultaneously. When RELAY* is low, both coils 41, 43 are energized, as current from voltage source VCC flows through both coils. However, when RELAY* is high, the voltage level of RELAY* equals VCC and no current flows through the coils. For the purposes of the present description, a suffix "*" is used to designate a signal which is a digital low when "true". Similarly, a prefix "_" is used on device input labels to indicate that those inputs are made "true" by a digital low signal.

To provide monitoring of the subring controlled by the subring module, a portion of the SUBIN signal is extracted for monitoring purposes. Resistor network 44 feeds a portion of SUBIN through transformer 45 which isolates the SUBIN input from the monitoring circuitry. The SUBIN signal is fed to a slope detection circuit consisting first of operational amplifier 46 which, with resistors 48, 50 and capacitor 49 amplifies (and inverts) the SUBIN signal. The output of amplifier 46 feeds the inverting terminal of a comparator 56 via RC network 52, 54. The comparator 56 is provided with hysteresis via voltage divider 60, 62 and feedback resistor 58 to provide upper and lower input voltage thresholds at which the comparator output changes. In the preferred embodiment, the upper switching threshold (when the comparator 56 output is high) is 175 mv, and the lower threshold (when the comparator output is low) is −175 mv. Although the signal SUBIN may be distorted due to transmission line effects, the RC network 52, 54 serves to differentiate the output of amplifier 46. The comparator 56 therefore switches due to changes in the slope of the SUBIN signal, and is impervious to rounding of the digital pulses of SUBIN, typically caused by transmission line effects. Given a high quality input signal SUBIN, the output signal SLOPE from comparator 56 is essentially identical to the input signal. However, if the quality of SUBIN is degraded, output SLOPE is still a sharp digital signal. The inverted output SLOPE* is taken from the inverting output of comparator 56.

From the slope detection circuitry, signals SLOPE and SLOPE* are input to a data detection circuit shown in FIG. 5 which analyzes these signals to determine when data is present on the subring. When no data is present on an HP-Apollo token ring, the signal on the cable is high for 83.3 nsec and low for 83.3 nsec (a 6 MHz square wave). When there is data, the length of time that the signal is high or low may be reduced to 41.7 nsec (depending on the data). This change in SUBIN (and therefore SLOPE) is detectable, and is used to determine if a token is present and if the subring is up.

The input portion of the data detection circuit uses two substantially identical comparator circuits for receiving inputs SLOPE and SLOPE*, respectively. Each circuit has a diode 78, 80 at its input, such that when the input is low, capacitors 82, 84 are discharged rapidly. Since SLOPE* is the inverse of SLOPE, each of the comparator circuits operates on a different half of the signal SLOPE. Each comparator is provided with hysteresis, comparator 66 using voltage divider resistors 89, 90 and feedback resistor 91, and comparator 68 using voltage divider resistors 92, 93 and feedback resistor 94. The following description is made with regard to the circuit of comparator 66, but is equally applicable to the circuit of comparator 68.

SLOPE is input to comparator 66 through resistor 74 and diode 78. When SLOPE goes high, capacitor 82 is charged through resistor 86, gradually increasing the voltage at the inverting input of comparator 66. Upon reaching the upper threshold switching voltage of the comparator, the comparator output SLOPEDH* switches from high to low. In the present embodiment, the switching thresholds for both comparators are about 3.5 V, with the upper threshold approximately 35 millivolts higher than the lower threshold. The RC time constant of resistor 86 and capacitor 82 is set such that the upper threshold voltage is overcome about 60 nsec after SLOPE goes high. This long delay is intentionally made longer than the expected 41.7 nsec pulse duration which indicates the presence of data. Thus, if high pulse is present which is shorter than about 60 nsec, capacitor 82 discharges before the switching threshold of capacitor 66 is reached, and SLOPEDH* remains high, indicating the presence of data.

When SLOPE goes low, capacitor 82 discharges through resistor 74, bringing the inverting input terminal of comparator 66 down in voltage. Upon reaching the lower threshold of the comparator 66, the output SLOPEDH* goes from low to high. The RC time constant of capacitor 82 and resistor 74 is set such that this threshold is overcome about 10 nsec after SLOPE goes low. Thus the delay provided after a negative edge of SLOPE is relatively short compared to that of a positive edge.

The circuit of comparator 68 functions in a manner essentially identical to that of comparator 66, but responds instead to signal SLOPE*. Comparator 68 has the same thresholds as comparator 66, and capacitor 84 and resistors 76, 88 generate the same charging and discharging time constants as the circuit of comparator 66. However, since the circuit of comparator 68 operates on SLOPE*, the output of comparator 68 is signal SLOPEDL, which has a long (60 nsec) delay responding to a falling edge of SLOPE (a rising edge of SLOPE*) and a short delay (10 nsec) responding to a rising edge of SLOPE (a falling edge of SLOPE*).

Figure 6:
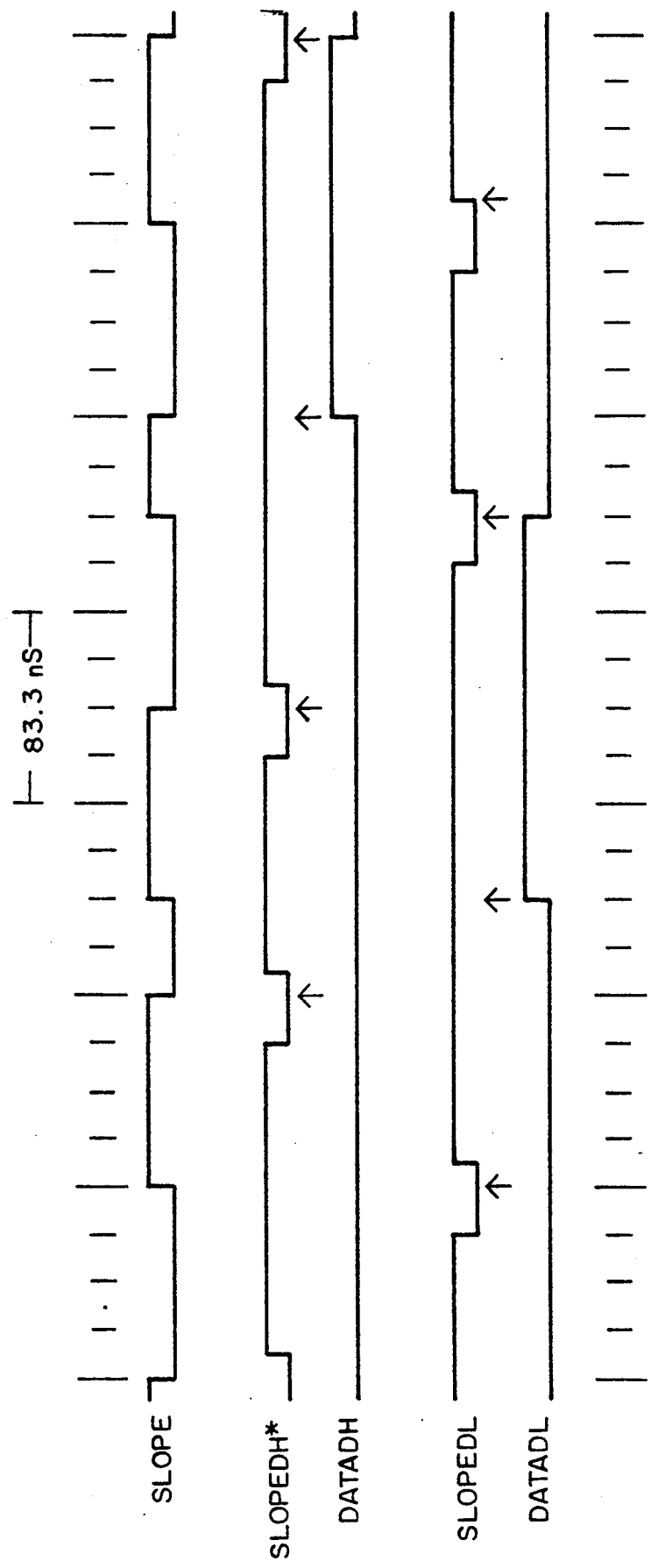
FIG. 6 is a timing diagram showing the relative timing of several signals generated in the circuit of FIG 5.

Some of the signals of the data detection circuit are shown in the timing diagram of FIG. 6. In FIG. 6, it can be seen that SLOPEDH* has a long delay in response to a rising edge of SLOPE, and SLOPEDL has a long delay in response to a falling edge of SLOPE. D flip-flop 70 has signal SLOPEDH* as a data input and signal SLOPE* as a clock input. Thus, the Q output of flip-flop 70 DATADH is high if SLOPEDH* is high at the falling edge of SLOPE (a rising edge of SLOPE*). DATADH being high therefore indicates the presence of a high pulse of SLOPE which is shorter than the 60 nsec delay of SLOPEDH*. Similarly, flip-flop 72 has SLOPEDL as a data input and SLOPE as a clock input. Thus, the Q output DATADL is high if SLOPEDL is high at a rising edge of SLOPE. DATADL therefore indicates the presence of a low pulse of SLOPE which is shorter than the 60 nsec delay of SLOPEDL.

Signals DATADH and DATADL are input to NAND gate 100, which feeds an inverted input of OR gate 102. When both DATAH and DATAL are high, the output of NAND gate 100 is low. This low input to OR gate 102 causes a high voltage output which is the parallel enable (_PE) input of four-bit counter 104. Counter 104 has SLOPE* as a clock input, and therefore responds to the falling edges of SLOPE. While the parallel load input of four-bit counter 104 is low (true), the counter is initialized to a count of two. The starting count of counter 104 is set to two by signal PUPA input to the 2nd lowest order bit (P1) of inputs P0-P3 and ground inputs to P0, P2, and P3. Signal PUPA is a pull-up voltage which is tied to VCC via resistor 99. Thus, when the output of OR gate 102 goes high, counter 104 starts counting from binary 2, and increases 1 with each falling edge of SLOPE as long as the parallel load input stays high (false).

The highest order bit Q3 of the 4-bit counter output Q0-Q3 produces signal TOK, and feeds one input of NAND gate 106. Q3 goes high after the counter has counted from the starting count of binary 2 to binary 8, and stays high until the counter counts past binary fifteen. Since the second input of NAND gate 106 is tied to PUPA, the output of the NAND gate 106 (TOK*) is low as long as TOK is high. Signal TOK goes high to indicate that a token is present when DATADH and DATADL have both been high for six falling edges of SLOPE (i.e. counter 106 counts from binary 2 to binary 8). Output TOK also feeds one input of NAND gate 108. Since the other input of NAND gate 108 is tied to PUPA, the output of the gate is low when TOK is high. This output then feeds back to a second inverting input of OR gate 102, keeping the output of that gate high for as long as TOK is high. This forces the counter to continue counting until the output count gets from binary eight to past binary fifteen and on to zero. When the counter reaches zero, it will be initialized to two by parallel load going low (assuming that DATADH and DATADL are not both high). Therefore, once output TOK is established, it remains high for eight falling edges of SLOPE.

In the present embodiment, it is necessary to monitor the signal SLOPE to ensure that a clock signal is present. If the clock goes away while DATADH and DATADL are both high, they might stay high causing the signal TOK to be generated erroneously. To check for the clock signal, SLOPE is input to a clock detection circuit which uses comparator 110. The signal SLOPE is input through inverter 112 which isolates the SLOPE signal from the effects of the clock detection circuit. Thus, a signal equivalent to SLOPE* is actually used in the detection.

If the periodic clock signal is present in the signal SLOPE, the periodic low pulses output by inverter 112 keep the inverting input of comparator 110 below the threshold. When SLOPE* goes low, current flows through diode 116 charging capacitors 120 and 118. When SLOPE* goes high, capacitor 118 is discharged through diode 114. As this process continues, the voltage on the inverting input of comparator 110 is kept below its threshold. The RC network formed by capacitor 120 and resistor 122 provides a time constant of about 100 microseconds. Thus, as long as the 6 MHz clock signal is present in the signal SLOPE, capacitor 120 sustains a large enough voltage to keep the inverting input of the comparator below its threshold. In addition, the output of comparator 110 (signal NOCLK*) is kept high being fed from VCC through resistor 124.

The comparator is provided with voltage thresholds by voltage divider resistors 126, 128, and feedback resistor 130. In the present embodiment, the thresholds are about 4 volts with the upper threshold (when NOCLK* is high) approximately 50 millivolts higher than the lower threshold (when (NOCLK* is low). Thus, as long as the inverting input of comparator 110 stays below the upper threshold, the output NOCLK* remains high. If, however the clock signal is lost, voltage begins to build up at the inverting input of comparator 110, being fed from VCC through resistor 122. Once this voltage exceeds the upper threshold, NOCLK* goes low, and disables flip-flops 70, 72. This forces DATADH and DATADL to remain a low voltage until the clock signal is restored. In addition, the signal NOCLK* is also input to the reset (_MR) input of counter 104, forcing the counter to be disabled when no clock signal is present.

From the data detection circuit, the signal TOK* is input to comparator 132 through resistor 134. When data is detected by the data detection circuit, TOK* is low for eight cycles of SLOPE. The rising edges of SLOPE are between 83 ns and 167 ns apart, and therefore TOK* is low for between 660 ns and 1340 ns. It is desirable to "stretch out" the signal TOK* to make it more usable. Resistor 134 is small compared to resistor 136, and discharges capacitor 138 quickly when TOK* goes low. The NAND gate 106, which drives TOK*, is an open collector output of gate 106 becomes open and the resistor 36 pulls TOK* high slowly. When TOK* goes low, the output of comparator 132 goes high. This in turn causes signal HAVTOK* to go low, since the output of comparator 132 passes through inverter 146. The output of the comparator is also tied to VCC via resistor 139. The thresholds of comparator 132 are set to about 3.3 volts with the upper threshold approximately 25 millivolts above the lower threshold, by resistors 140, 142 and feedback resistor 144.

The RC combination of resistor 134 and capacitor 138 is such that the discharge time for a previously high voltage on the comparator 132 inverting input to drop below the lower threshold is about 200 ns. However, resistor 136 is much larger than resistor 134, and in combination with capacitor 138 provides a charge time of about 1 ms before the voltage on the inverting input of comparator 132 exceeds the upper threshold. Thus, the HAVTOK* signal is a "stretched" version of TOK*.

Signal HAVTOK* is passed through resistor 148 and diode 150 to the inverting input of comparator 152. Resistor 154 and capacitor 156, together form an RC charge/discharge circuit. When HAVTOK* is high, capacitor 156 is charged through resistor 154 from VCC. The value of resistor 154 is selected to provide a charging time of about 200 ms. When HAVTOK* is low, capacitor 156 discharges through resistor 148. The value of resistor 148 is selected to provide a discharge time of about 10 ms. The relative arrangement of the RC circuit is such that if one token is being received about every 10 ms, the inverting input of comparator 152 is at about 2 volts.

When the network is down, machines occasionally generate tokens to try to get the network back up. With the preferred embodiment, these sporadic tokens occur with less frequency than 3 for each 200 ms interval. It is necessary that the network not be considered up because of these sporadic tokens. The resistors 148 and 154 along with capacitor 156 were chosen such that if 3 or fewer tokens are received for each 200 ms interval, the network is considered down. If 20 or more are received for each 200 ms interval, the network is considered up. The region between 3 and 20 tokens for each 200 ms is left as undefined. The exact number of tokens that correspond to the network up and network down thresholds is not defined. This leeway is left to allow for tolerances in the components and some hysteresis in the circuit.

The resistors 158, 660, and 162 are in a feedback arrangement for comparator 152, and provide the comparator circuit with a switching threshold of about 3.3 volts. The threshold when comparator 152 is high is approximately 25 millivolts higher than when the output of the comparator is low. Thus, if a token is being received regularly, the output of comparator remains high. This high voltage is inverted and buffered by inverter 164 to provide signal NETUP1*. NETUP1* is in turn inverted by inverter 166 to provide the signal NETUP1. In addition to the feedback arrangement, the output of comparator 152 is also tied to VCC via resistor 159.

Figure 7:
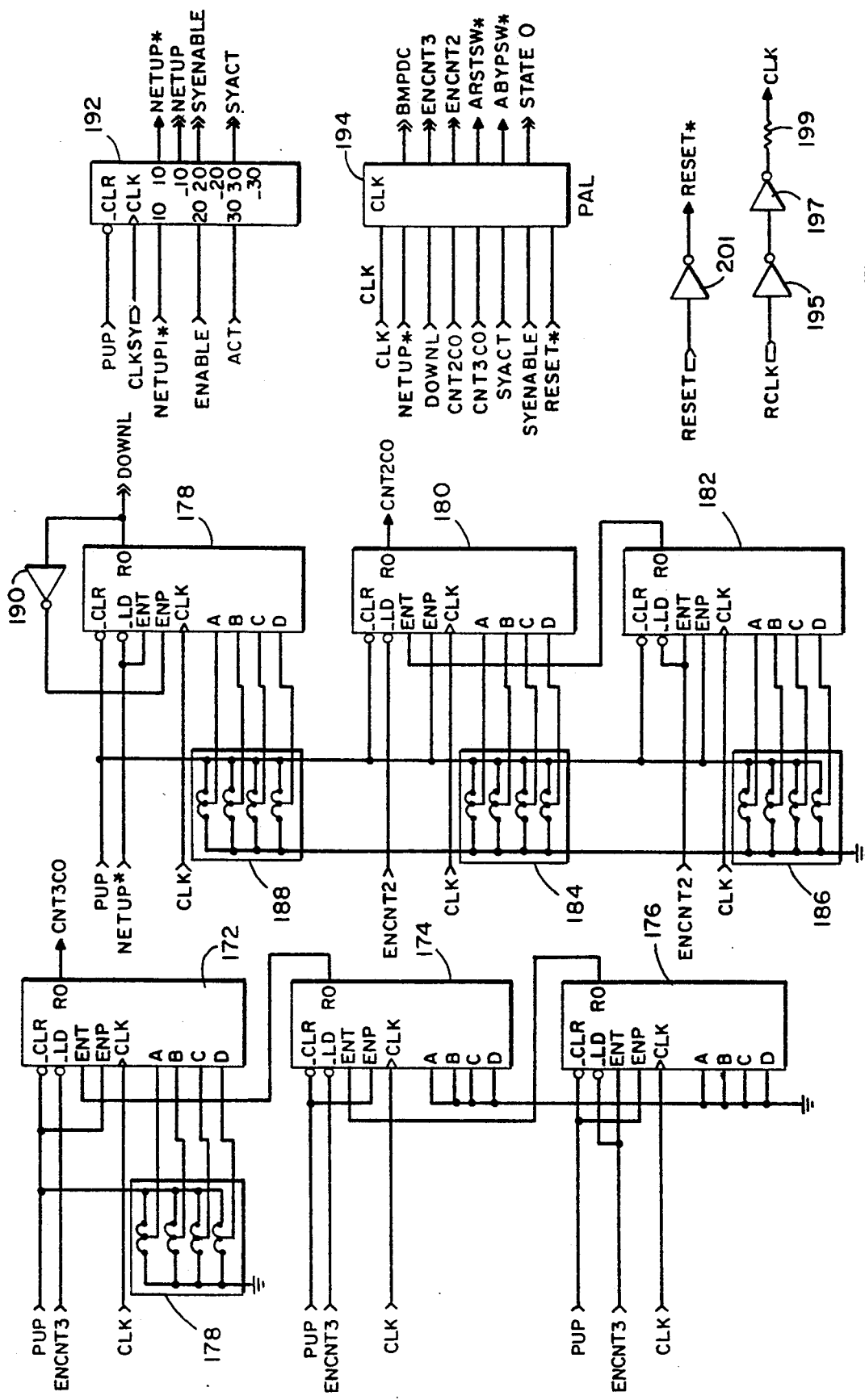
FIG. 7 shows three counter circuits, a signal synchronizer, and a programmable array logic element of the subring module state machine.

Shown in FIG. 7 are three 4-bit counters 172, 174, and 176. The counters 172, 174, 176 are cascaded together to form one 12-bit counter. The data inputs of counters 174, 176 are tied to ground to zero the inputs upon loading of the counters. Similarly, the data inputs of counter 172 are tied to jumper array 178. Each of the four jumpers of the jumper array 178 is manually tied to either the high voltage pull-up PUP, or to ground. Thus, when counter 172 is loaded, the starting count is input from the jumper selections. Each of the counters 172, 174, 176 has a load (_LD) input controlled by signal ENCNT3. The load input serves to cause the loading of whatever digital voltages are present at the data inputs of each counter 172, 174, 176 when the signal ENCNT3 goes low.

To enable the counting of each of the counters, both enable input ENT and enable input ENP must be high. As shown in the figure, input ENP of each of the counters 172, 174, 176 is tied to high voltage PUP, and the enabling of the counters is therefore controlled by the ENT inputs. The enabling of counter 176 is accomplished by the signal ENCNT3 going high. Since the ripple carry-out output (RO) of counter 176 feeds enable input ENT of counter 174, and the ripple carry-out output of counter 174 feeds enable input ENT of counter 172, counter 176 represents the lowest four bits of the count, counter 174 represents the middle four bits of the count, and counter 172 represents the highest four bits of the count. Thus, after all three counters have finally counted out, the ripple carry-out output of the counter 172 goes high for one clock pulse. This output is signal CNT3CO, and represents the completion of the desired long wait state CNT3N.

Similar to the arrangement of counters 172, 174, and 176 is the cascaded arrangement of 4-bit counters 180 and 182. Counters 180, 182 are cascaded together to provide an 8-bit binary counter for counting out the wait period CNT2N. The value of CNT2N is controlled by setting the data inputs of the counters 180, 182 to a fixed starting count value by manually attaching the jumpers of jumper arrays 184, 186 to either high voltage signal PUP or to ground. When signal ENCNT2 goes low at the _LD inputs of the counters 180, 182, the digital values from the jumpers are loaded into the counters 180, 182. Since input ENP of each of the counters 178, 180, 182 is tied to high voltage PUP, the counter 182 is enabled by the signal ENCNT2 going high at input ENT, and begins increasing its count by one for each clock cycle at input CLK.

When the count of counter 182 exceeds binary fifteen (1111), the output RO of the counter 182 goes high for one clock cycle, strobing the enable input ENT. Counter 182 then starts counting again from zero. Each time counter 182 passes binary fifteen, the enable input ENT of counter 180 is strobed for one clock cycle, allowing it to advance its count by one. Thus, the counters 180, 182 represent an 8-bit counter, counter 182 counting the lower four bits, and counter 180 counting the upper four bits. When the 8-bit count of counters 180, 182 passes binary 255, signal CNT2CO goes high for one clock cycle as the counters 180, 182 count to zero. ENCNT2 then goes low and on the next clock cycle, the counter is reinitialized to the number specified by the jumpers.

Counter 178 is also a 4-bit counter and is used for sensing when the network is down for several clock cycles and providing the DOWNL output. The starting count of counter 178 is input using the jumpers of jumper array 188. Enable input ENP of counter 178 is connected to carry output (RO) via inverter 190. Since the signal output at output RO is DOWNL, the ENP enable input is enabled as long as DOWNL is low. However, once DOWNL goes high, the input ENP goes low and the counter is disabled, keeping DOWNL high until the network comes back up. The second enable input ENT and the load input _LD of the counter 178 are both tied to signal NETUP*. When the network comes back up, NETUP* goes low. DOWNL is then immediately forced low by NETUP* being input to the ENT input of counter 178. NETUP* at the _LD input of counter 178 causes the counter to be initialized to the number specified by the jumper, on the next clock tick. However, if the network goes down, signal NETUP* switches to a high voltage state, and the counter is enabled by the inputs ENT and _LD going high. The counter 178 begins counting from the starting count value input from the jumpers.

If the network goes back up prior to the output of counter 178 reaching digital fifteen, signal NETUP* goes low once again, and the counter is disabled. In addition, NETUP* being low causes the _LD input to initiate a reloading of the data from jumper array 188 into the counter, resetting the count. However, if counter 178 exceeds digital fifteen prior to NETUP* returning to a low voltage state, signal DOWNL switches to a high voltage state, and remains in that state until NETUP* once again goes low, resetting the count of the counter 178.

Figure 7A:
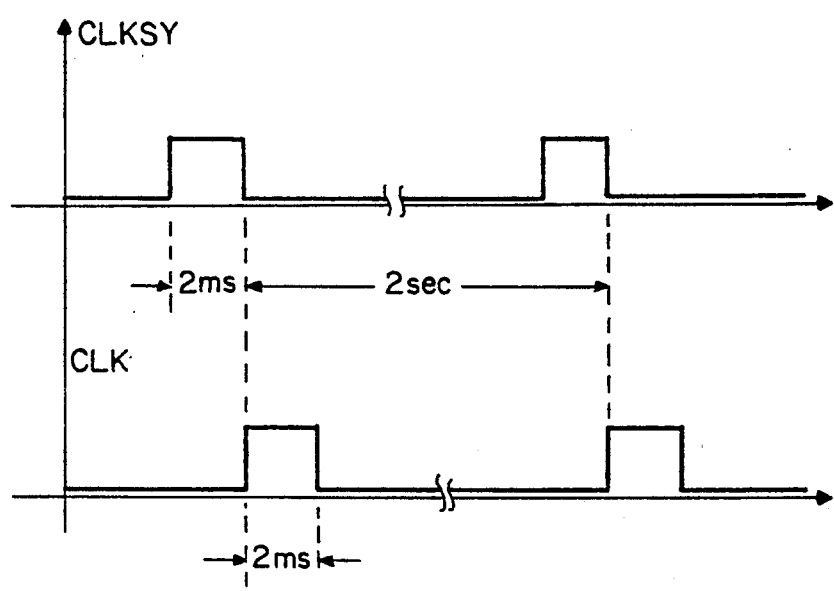
FIG. 7A shows the relationship between signals CLK and CLKSY of a state machine of the present invention.

Also shown in FIG. 7 is flip-flop synchronizer 192. The synchronizer consists of several D-type flip-flops all synchronized to one clock input. Signal CLKSY is generated using the same clock oscillator source used to generate the clock for the state machine (CLK), and is input at the clock input CLK of the synchronizer 192. CLKSY comes shortly before CLK such that the outputs of the synchronizer are stable well before the main clock tick (CLK) comes and advances the state machine. The relationship between signals CLK and CLKSY in the preferred embodiment is demonstrated in FIG. 7A. As shown, each signal consists of 2 ms pulses generated at a frequency of 0.5 Hz. The synchronizing clock signal CLKSY leads the CLK signal by 2 ms. This allows proper synchronization of signals by synchronizer 192 (FIG. 7).

Asynchronous signals NETUP1*, ENABLE, and ACT are each input to the D-input of one of the flip-flops of synchronizer 192. The _CLR input of the synchronizer is held high by signal PUP. The non-inverting output of each of the flip-flops mimics the input, but not until the signals at the inputs are clocked through the flip-flops by clock input CLKSY. This produces the synchronized output signals NETUP*, SYENABLE, and SYACT, which do not have the hazard risks of the asynchronous input signals. Also taken from the output of the synchronizer is signal NETUP which is present at the inverting output of the flip-flop to which NETUP* is input.

The symbol used to designate the input port of CLKSY is different than other signal ports which are represented by arrow heads or tails. The symbol shown at the port of CLKSY designates a signal which, in the preferred embodiment, originates from off the printed circuit board on which the other illustrated circuitry of the figure is located. Although for practical purposes, the particular board of origination does not have an effect on the practice of the invention, the symbols are included to show where "off-the-board" connections are used in the preferred embodiment. Other signals in FIG. 7 showing this port symbol include RRESET and RCLK. The symbol is similarly used in other figures to designate "off-the-board" connections.

Most of the functions of the state machine which are indicated in the flowchart of FIG. 2 are performed by combinational digital logic in response to signals generated by various detection and timing circuitry. The combinational logic used may take a number of different forms, each of which are well known in the art and accomplish the same results In the preferred embodiment of the invention, the combinational logic is in the form of a Programmable Array Logic Unit (PAL) 194 (shown in FIG. 7), which is programmed to generate a number of desired output signals in response to certain combinations of input signals. The internal programming of the PAL 194 is described graphically by the flowchart of FIG. 2. The equations used to program the PAL 194 in the preferred embodiment are shown in Table 1 which is included at the end of this description. The equations are in "abel" format and can be used with a PAL20RS8 or a PAL22V10 type PAL 194.

Inputs NETUP*, DOWNL, CNT2CO, and CNT3CO to the PAL 194 have been discussed previously. Input SYACT is a signal indicating that the subring is switched into the network. Signal SYENABLE is a signal indicating that the subring module is in automatic mode. If SYENABLE is low, the module is forced to state 0 and remains there regardless of the other inputs. Signal RESET* is an input which forces the state machine to state 0 when the system is powered up or when manually reset by pushing the reset button The signals SYACT, SYENABLE, and RESET* are discussed further hereinafter.

As mentioned, the inputs CLK and RESET* originate from off the board. Signal CLK is generated from signal RCLK which is buffered by inverters 195, 197 and passed through resistor 199, before being input to PAL 194. Signal RESET* is generated from signal RRESET which is from off the board and which is buffered and inverted by inverter 201.

Outputs ENCNT3 and ENCNT2 of PAL 194 have been discussed previously, and are used in reinitializing-/enabling counters 172, 174, 176 and counters 180, 182, respectively. Output BMPDC is a signal used to bump (increment) the down counter. Signals ARSTSW* and ABYPSW* are automatic switch control signals which are used in controlling the relays which switch the subring in and out of the network. Signals BMPDC, ARSTSW*, and ABYPSW* are discussed in further detail hereinafter. Signal STATE0 is an output signal of PAL 194 which indicates that the subring module state machine is in state zero. Signal STATE0 is not, in itself, a functional signal, but is used to drive an LED display to indicate to a user that the system is in state 0. Signal STATE0 may also be used as an input to a microprocessor if microprocessor system control is used.

Figure 8:
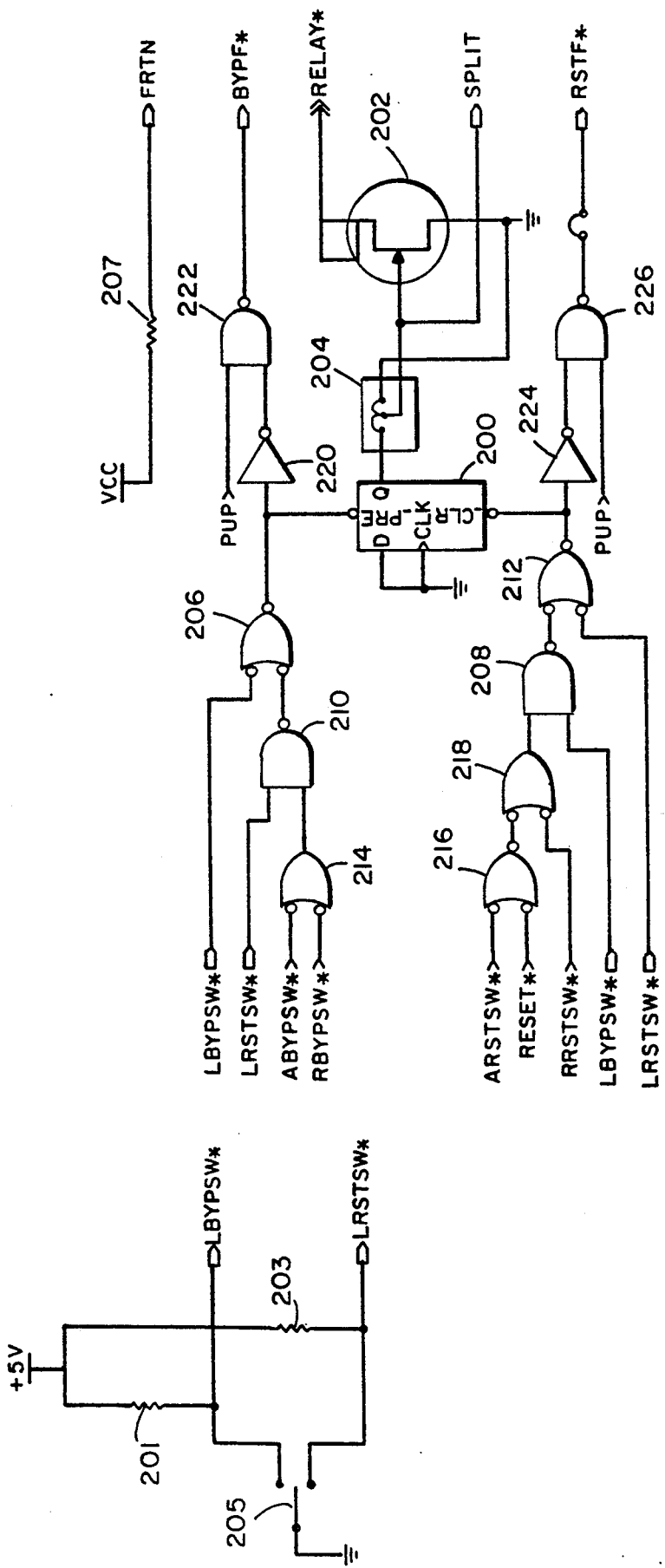
FIG. 8 shows switching circuitry of the subring module.

Shown in FIG. 8 are a number of switch inputs for controlling the switching of the subring module. D-type flip-flop 200 has its D input and CLK input tied to ground, and therefore functions as an asynchronous flip-flop. The non-inverted output Q of flip-flop 200 is connected to the gate of field-effect transistor (FET) 202 via jumper 204. The jumper 204 can be set manually to alternatively connect the FET input to ground to disable the switching of the relays 41 and 43 shown in FIG. 4. With the FET disabled, the signals BYPF* and RSTF* can be used to control an external switch instead of relays 41 and 43. Such an arrangement is typical when using a DFL-100.

The drain of FET 202 is tied to the switching relays of the subring module as the signal RELAY*. The source of FET 202 is tied to ground, and a high voltage at the gate input of the FET therefore causes current flow through the FET, and signal RELAY* goes low. Since the subring is normally switched into the network, signal RELAY* going low causes the relays of FIG. 4 to be energized, switching the subring out of the network. As shown, the Q output of the flip-flop 200 is also used to generate the signal SPLIT.

Since the only input signals to the flip-flop 200 are at the preset (_PRE) input and the clear (_CLR) input, the Q output is directly controlled by the state of these signals. If input PRE is low, it forces the Q output of the flip-flop 200 to be high, thus splitting the subring off the network. If input _CLR to the flip-flop is low, it forces the Q output to be low, thus keeping the subring from splitting off the network. Switching of the flip-flop is controllable from a number of different switch inputs.

Signals LBYPSW* and LRSTSW* are from a local manual switch which allows a user to manually override state machine control of the subring switching. As shown in FIG. 8, a 5-volt supply fed through resistors 201, 203 provides a high voltage for both of the signals LBYPSW* and LRSTSW*. However, a three position switch 205 can connect one of the signals to ground depending on which position the switch is in. Thus, when one of the signals is 5 V, the other is 0 V. The outputs of the switch 205 (LBYPSW*, LRSTSW*) are not shown directly connected to gates 206, 208, 210, 212, but are instead shown with off-the-board terminals. This is because, in the prefereed embodiment, the manual switches are actually located away from the circuitry, and are connected to a printed circuit board on which the other circuitry of FIG. 8 is mounted by external connections. The two local switch signals are used to control both the preset and the clear inputs of flip-flop 200. Signal LBYPSW*, when in a low voltage state, forces the output of NOR gate 206 (which has two inverting inputs) to be low. This low signal feeds the _PRE input of flip-flop 200, forcing the Q output high. Signal LBYPSW* is also input to one of two inputs of NAND gate 208. This input, when low, prevents the output of gate 208 from being low, and inhibits any control of the _CLR input of the flip-flop 200 by any of the signals ARSTSW*, RESET*, or RRSTSW*.

The other local switch input is signal LRSTSW*. Signal LRSTSW* is input to one of two inputs of NAND gate 210. When this signal is low, the low input to the NAND gate prevents the output of the NAND gate from going low, and inhibits any control by signals ABYPSW* or RBYPSW*. In addition, signal LRSTSW* is also input to one of two inverting inputs of NOR gate 212. Thus, signal LRSTSW* being low forces the output of NOR gate 212 to be low. The output of NOR gate 212 is input to the _CLR input of flip-flop 200, and the low voltage therefore forces a low output at the Q output of flip-flop 200.

In addition to the local manual switches, automatic switching inputs are also provided to allow the state machine of the subring module to control the switching of the subring. Signals ABYPSW* and ARSTSW* allow the subring to be switched into and out of the network by state machine control. When the local switch is not used, signals LBYPSW* and LRSTSW* are both high, so as not to disable automatic control. Thus, when signal ABYPSW* is in its low voltage state, the output of OR gate 214 is high, and therefore the output of NAND gate 210 is low. This forces the output of NOR gate 206 low which activates the preset input of flip-flop 200, forcing the Q output high. Similarly, if signal ARSTSW* is low, the output of NOR gate 216 is forced low, therefore forcing the output of OR gate 218 high. This high output combines with the high input from signal LBYPSW* to force the output of NAND gate 208 low. When the output of NAND gate 208 is low, the output of NOR gate 212 is forced low, causing the _CLR input of flip-flop 200 to generate a low voltage at the Q output.

Also provided with the switching circuitry is an input for remote input bypass signal RBYPSW* and remote input reset signal RRSTSW*. Each of these signal inputs are provided to allow access to the switching of the subring module to an external data processor which might be used in controlling the overall system. Such a data processor might be part of a microprocessor which is linked to all the subring modules and provides unified control of all of the token passing ring switching circuitry within a chassis. As shown in FIG. 8, the remote signals are input through NOR gate circuitry together with the automatic signal inputs. Thus, either the automatic or remote input switches may take control of the switching at any time, if not inhibited by the position of the local manual switches. Also provided is signal RESET* which is connected through NOR gate circuitry together with the automatic and remote input signals, in the input sequence feeding the _CLR input of flip-flop 200. Like the remote reset input and the automatic reset input, signal RESET* going low forces the subring into a "switched-in" state, if this state is not already forced by the local switches. The signal RESET* is generated at system power-up as part of the initialization to state 0.

Also shown in FIG. 8 are signal outputs BYPF* and RSTF*, which are input to a fiber optic link such as an HP-Apollo DFL-100, if it is present. The BYPF* signal tells the DFL-100 to switch the subring off the main network. The remote control inputs of a DFL-100 are optically isolated, and each of the two control inputs has a return (RTN) signal associated with it. When a sufficient current is present through the signal and its return, the signal is regarded as true. Resistor 207 limits the current available to the signal FRTN which is used as the return for both BYPF* and RSTF*. NAND gates 222 and 226 are open collector drivers which drive BYPF* and RSTF*. When BYPF* and RSTF* are false, no current will be flowing through the two inputs. When either BYPF* or RSTF* is true (low), the corresponding NAND gate will pull the signal low causing a current to flow through the DFL-100's input.

Signal BYPF* is generated by inverting the output of NOR gate 206 with inverter 220, and inputting the inverted signal to NAND gate 222 along with high voltage PUP. Thus, when the output of gate 206 is low, the output of gate 222 is also low to tell the DFL-100 to switch the subring off the main network. Similarly, signal RSTF* is generated by inverting the output of NOR gate 212 with inverter 224 and inputting the inverted signal to NAND gate 226 along with high voltage PUP. Thus, the output of gate 226 is low when the output of gate 212 is low to tell the DFL-100 to switch the subring into the network.

Figure 9:
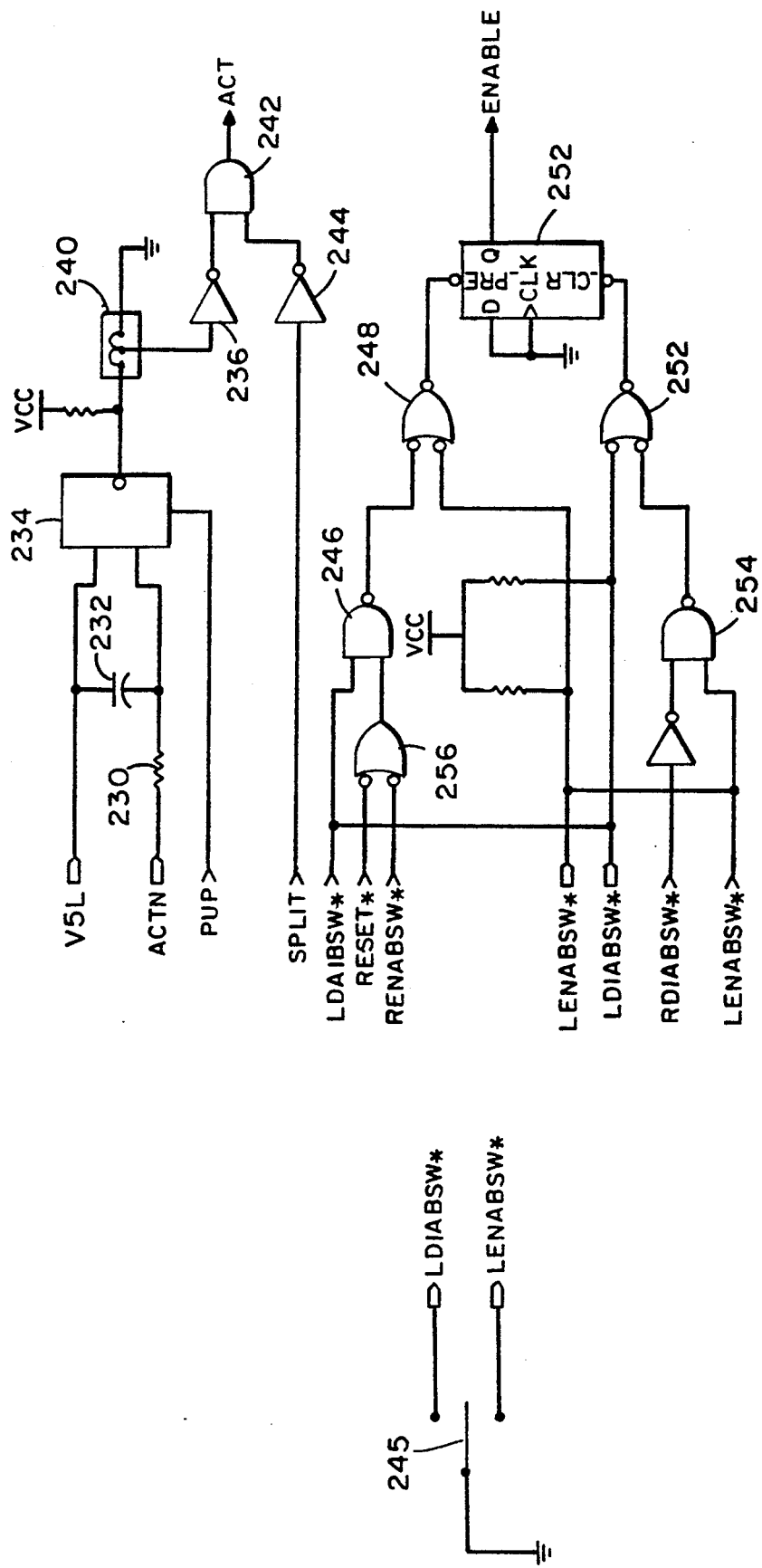
FIG. 9 shows a circuit for generating a system enable signal and a circuit for indicating the switch position of the subring module.

FIG. 9 shows a circuit used to detect when the DFL-100 has the subring switched into the main network. Signals V5L and ACTN are taken from the DFL-100, and are coupled through resistor 230 and capacitor 232 to optical isolator 234. The optical isolator 234 has an LED which outputs an optical signal generated by the electrical signal from inputs V5L and ACTN. This optical signal is detected within the optical isolator by a photodiode which outputs an electrical signal at output 0. If the DFL-100 has the subring switched in, a current flows through ACTN and V5L causing the 0 output of the isolator to be low, and the output of inverter 236 to be high. If the DFL-100 has the subring switched out, no current flows through ACTN and V5L, so the output of the isolator does not pull the input of inverter 236 low, and in combination with the VCC input through resistor 238, keeps the inverter output at a low voltage. The jumper 240 is provided to set the inverter 236 input to ground if a DFL-100 is not being used with the subring.

The output of inverter 236 is input to AND gate 242 along with the output of inverter 244, which inverts signal SPLIT. If the subring is split from the network, signal SPLIT is high and the output of inverter 244 is low. Similarly, if the DFL-100 is not active, the output of inverter 236 is low. Since the output of AND gate 242 requires both inputs to be high in order to have a high output, the output signal ACT is high only if the subring is switched in and the DFL-100 (if present) is active.

Also shown in FIG. 9 is circuitry for controlling the enablement of the subring module. The signal ENABLE is passed through the synchronizer 192 of FIG. 7 to become SYENABLE, and is from there input to PAL 194. If signal ENABLE is high, the system operates normally However, if signal ENABLE is low, the state machine is forced into state 0, disabliing the automatic control of the subring by the state machine. Switch 245, which is located "off the board", is a three position manual switch. In the position which pulls LDIABSW* low, it forces the signal ENABLE low. In the position which pulls LENABSW* low, the switch forces the signal ENABLE high. In the center position, the switch has no effect on ENABLE, thus allowing ENABLE to be controlled remotely. If the switch 245 is in the position which grounds LDIABSW*, the output of NAND gate 246 is forced to remain high, and there is no effect on the output of NOR gate 248 by RESET* or RENABSW*. However, signal LDIABSW* being low draws one of two inverting inputs of NOR gate 250 low, forcing the output of the NOR gate to be low, thus activating the _CLR input on flip-flop 252. Flip-flop 252 is wired in the same manner as flip-flop 200 of FIG. 8, and therefore the CLR input being forced low forces the Q output (ENABLE) of the flip-flop 252 to be low.

When the switch 245 is in the position to ground LENABSW*, the output of NAND gate 254 is forced high (disabling the RDIABSW* input), and the output of NOR gate 248 is forced low. Thus, the _PRE input of flip-flop 252 is activated and the signal ENABLE is forced high. Remote signal inputs for signals RENABSW* and RDIABSW* are also provided to allow enabling and disabling of the system by microprocessor control. Signal RENABSW* is input to one of two inverting inputs of OR gate 256, and can cause the _PRE input of flip-flop 252 to be activated as long as LDIABSW* is high. Signal RDIABSW* is input to AND gate 254 through inverter 258, and can cause the activation of the _CLR input of flip-flop 252 as long as LENABSW* is high. Thus, if not inhibited by the local switches, a controlling microprocessor can force signal ENABLE either high or low. Signal RESET* is also input to one of the inverting inputs of NOR gate 256, and therefore can force the high state of ENABLE if not inhibited by signal LDIABSW*.

Shown in FIG. 10 is circuitry for the system down counter. 4-bit counter 260 has its _CLR input and enable input ENT tied to high voltage PUP. Signal CLK is input to the CLK input of the counter, and the counter data inputs are tied to ground. Controlling the loading of counter 260 is signal RSTDC*, which causes the loading of all zeroes into the counter when it is low. The counter 260 then increments one for each clock pulse received while input ENP is high. Thus, the incrementing of the down counter is controlled by input signal BMPDC, which is input to NAND gate 262. As long as the counter has not counted out, the RO output of the counter is low and the output of inverter 264 is high. Any high voltage from signal BMPDC therefore causes the output of NAND gate 262 to go low, which is then inverted by inverter 266 to be a high input to the counter input ENP. Signal BMPDC is a single pulse generated by PAL 194 each time the down counter is to be incremented in accordance with the system state diagram (FIG. 2). Thus, each generation of BMPDC causes one incrementation of the down counter. The outputs of the counter 260 drive LED array 268, which display the current count of the down counter to a system user. When the down counter reaches fifteen, the carry output RO of the counter 260 goes high, causing ouput of inverter 264 to go low. This stops the counter from incrementing further by forcing the output of NAND gate 262 high and thus preventing further enable signals to the ENP input. The counter 260 therefore stays in this state until it is reset by signal RSTDC.*

Also shown in FIG. 10 is LED array 270 which is used for displaying the current state of certain system conditions to a system user. Each of the LEDs of array 270 are tied between VCC and an output of one of isolating LED drivers 272 and 274. The signals input to drivers 272, 274 are SYENABLE, NETUP1, STATE0, ACT, DOWNL, ENCNT2, and ENCNT3. When any of these signals is high, a corresponding output of one of the drivers 272, 274 is low. This results in one corresponding LED to light as current is drawn through the LED.

Figure 11:
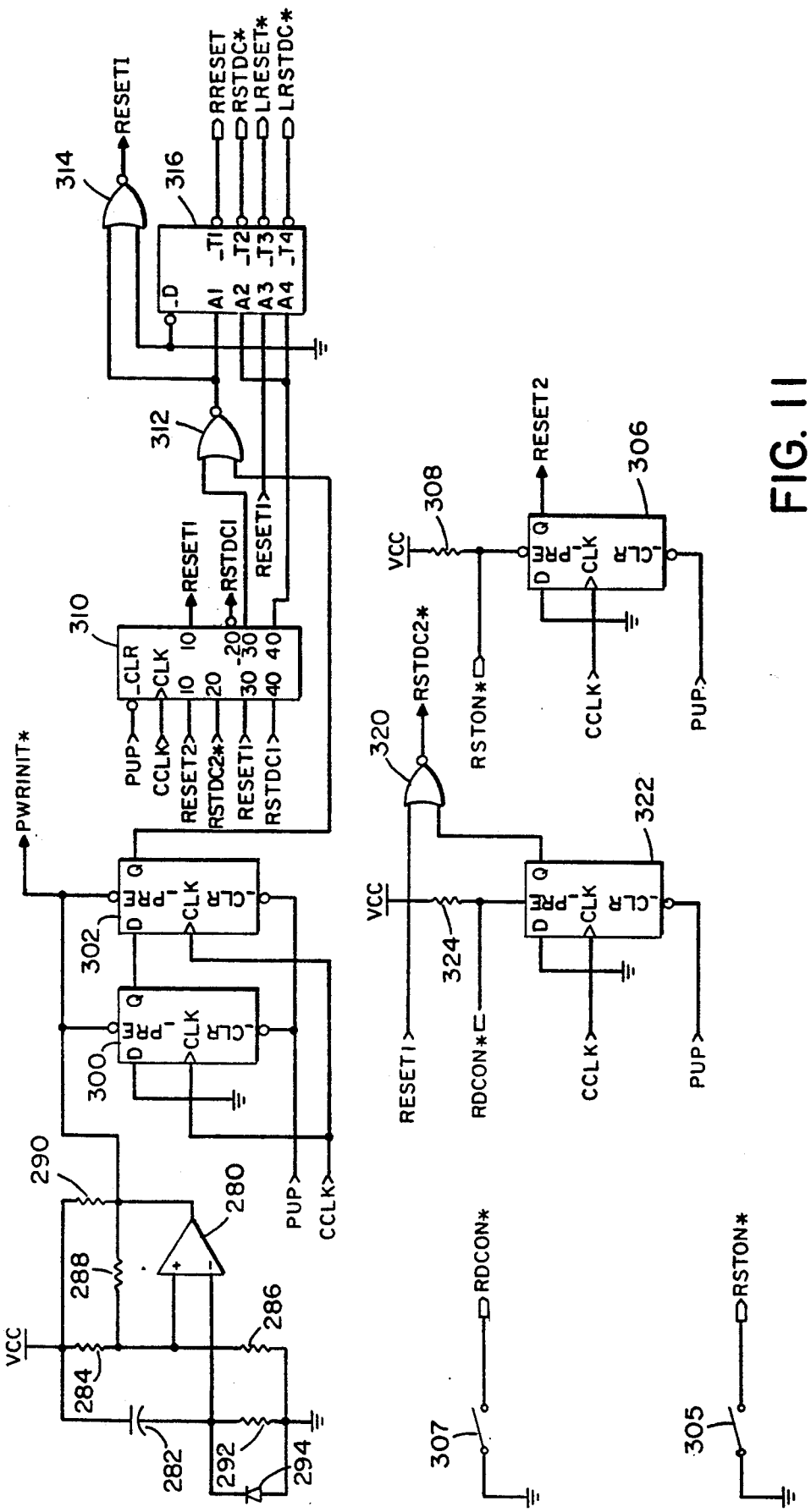
FIG. 11 shows the power-up and reset circuitry of the present invention.

FIG. 11 shows an initialization circuit for controlling the state of the subring module electronics at power-up. Comparator 280 has its negative input terminal tied to VCC through capacitor 282. When system power is turned on, capacitor 282 appears as a short circuit, and the voltage on the negative input terminal of comparator 280 exceeds the voltage on the positive input terminal, and the output of the comparator is a low voltage. The positive input terminal of the comparator 280 has a voltage defined by the voltage divider made up of resistor 284 and resistor 286. In addition, hysteresis is provided to the comparator by feedback resistor 288 which prevents oscillations in the comparator circuit. VCC is also fed to the comparator output through resistor 290.

After power-up, charge begins to build up on capacitor 282, the rate of the charging being determined by the value of the capacitor and of resistor 292. Once the capacitor charges to the point at which the voltage on resistor 286 exceeds the voltage on resistor 292 by the switching threshold of the comparator 280, the output of the comparator switches from a low voltage to a high voltage. Thus, after system power-up, a low pulse is generated at the output of the comparator 280, before the output goes high and stays high. Diode 294 is provided to discharge capacitor 282 when power is removed.

The low pulse generated at the output of comparator 280 at power-up is signal PWRINIT*, and is input to the _PRE inputs of D-type flip-flops 300 and 302. The _CLR inputs of both flip-flops 300, 302 are tied to high voltage PUP. Both flip-flops 300, 302 have clock signal CLK input to their CLK inputs, and are therefore synchronized with one another. The low pulse forces the Q outputs of both flip-flops to be high. Flip-flop 300 is grounded at its D input, and its output therefore goes low with the first clock tick after the output of comparator 280 goes high. However, since the D input of flip-flop 302 is fed by the Q output of flip-flop 300, it has a high voltage as an input at the first clock tick. Thus, the output of flip-flop 302 is high for at least two ticks at system power-up.

Also shown in FIG. 11 is input signal RSTON*, which is generated by off-the-board manual reset switch 305 and input to the _PRE input of D-type flip-flop 306. The _CLR input of flip-flop 306 is held high with signal PUP and the PRE input is at a high voltage, being fed by VCC through resistor 308. The D input of the flip-flop is tied to ground and the CLK input is tied to signal CLK. Thus, since signal RSTON* is ordinarily high, the Q output signal (RESET2) of the flip-flop 306 is ordinarily low. However, when the manual reset switch is closed, signal RSTON* changes from a high to a low voltage state, and signal RESET2 at the Q output of flip-flop 306 is forced high.

Signal RESET2 is input to synchronizer 310 which is a package of four D-type flip-flops all of which are responsive to a single CLK input from signal CLK. RESET2 is input to a first D input (input ID) of the synchronizer, and is clocked through the synchronizer by signal CLK to generate signal RESET1 at a first Q output (output 1Q). Signal RESET1 is then input back to input 3D of the synchronizer 310, and the signal is clocked through the synchronizer 310 a second time. The signal at output 3Q of synchronizer 310 is input to NOR gate 312 along with the Q output from flip-flop 302. The output of the NOR gate 312 is input to NOR gate 314 to invert the signal. The other input of NOR gate 314 is tied to ground, so the gate 314 functions as an inverter. The output of the NOR gate 314 is signal RESETI, which goes high in response to either system power-up or the closing of the manual reset switch. The output of NOR gate 312 is also input to the A1 input of buffer 316, which buffers and inverts the signal to create signal RRESET at the Y1 output of the buffer 316.

The signal RESETI is used to generate a reset signal for the system down counter. RESETI is input to NOR gate 320, the other input of which is tied to the Q output of D-type flip-flop 322. Flip-flop 322 is connected in an arrangement similar to that of flip-flop 306. Signal RDCON* is tied to the PRE input of flip-flop 322, which is tied to high voltage VCC through resistor 324. RDCON* is generated off the board from manual switch 307 which is tied to ground. Either signal RDCON* going low, or signal RESETI going high causes signal RSTDC2* to go from high to low. Signal RSTDC2* is input to the 2D input of synchronizer 310 to be synchronized to signal CLK. The inverting _2Q output is used to get synchronized signal RSTDC1 which goes high in response to signal RSTDC2* going low. RSTDC1 is then input to the 4D input of synchronizer 310, and the 4Q output is input to inputs A2 and A4 of buffer 316. The result is buffered and inverted signals RSTDC* and LRSTDC* at the Y2 and Y4 outputs of the buffer 316. The buffer 316 is also used to create signal LRESET* which is a buffered and inverted form of signal RESET1.

Signal RSTDC* is shown in FIG. 10 as the signal for resetting the down counter, and has been discussed previously with regard to that figure. Signal RRESET is inverted by inverter 201 (FIG. 7), the output of which is signal RESET*. Signal RESET* is the reset input to PAL 194 of FIG. 7 for use in controlling state machine functions. RESET* is also used throughout other portions of the subring module circuitry, as shown and discussed previously. The signals LRESET* and LRSTDC* are provided to allow the resetting of the system and the down counter to be displayed on LEDs.

Figure 12:
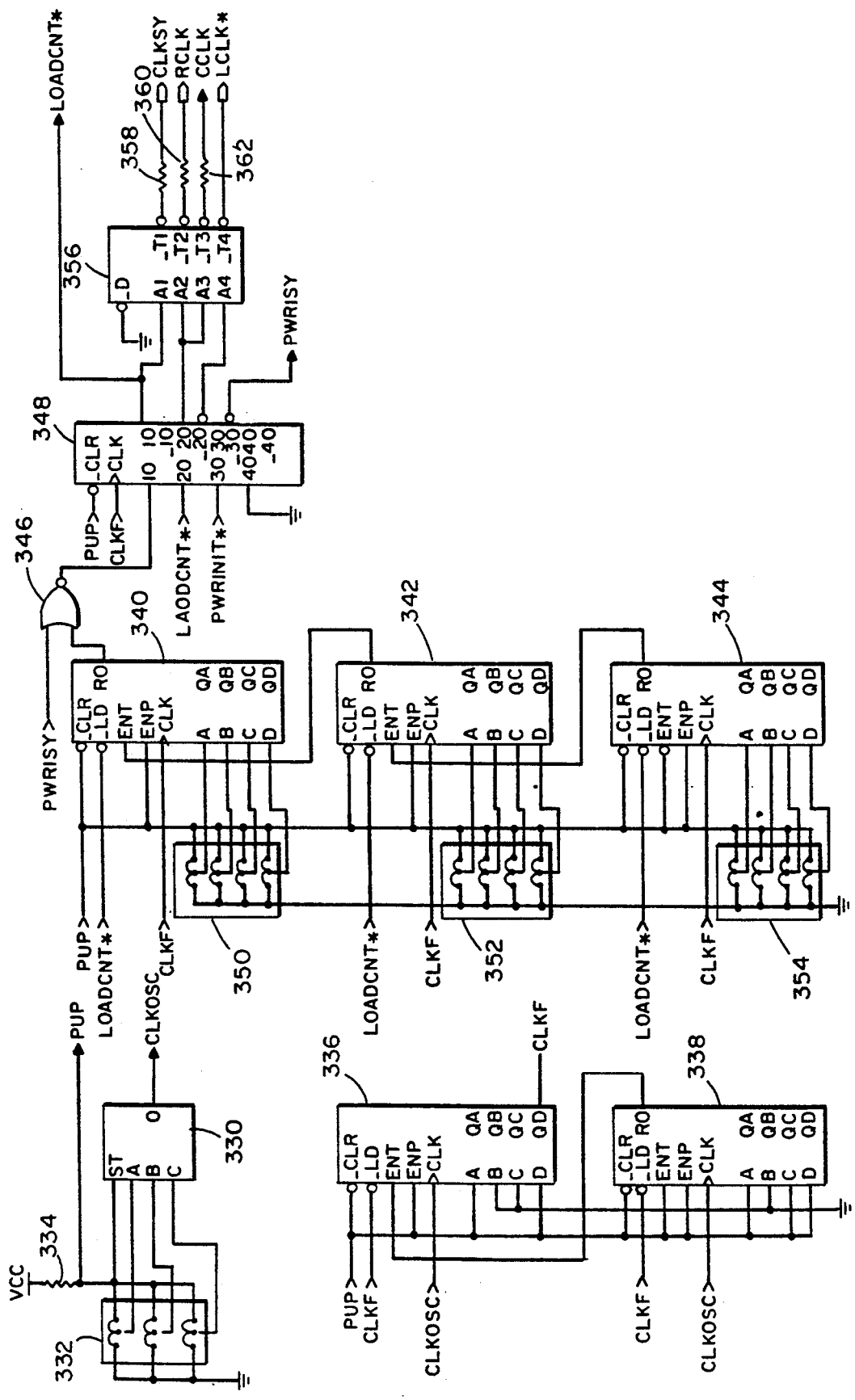
FIG. 12 shows the circuitry used for generating the clock signals used with the present invention.

FIG. 12 shows the clock signal generation circuitry for the subring module. Oscillator 330 is an integrated circuit oscillator such as an ESC-300-12.8. The jumper array 332 is set to tie each of the ST, A, B, or C inputs of the oscillator to either ground or a high voltage fed from VCC through resistor 334. The high or low voltage state of these inputs determines the output frequency of the oscillator 330. In the preferred embodiment, the jumpers are arranged such that the output signal CLKOSC of the oscillator 330 is a 50 KHz square wave. Signal CLKOSC is then input to the CLK inputs of cascaded 4-bit counters 336, 338.

The counters 336, 338 have data inputs which are each tied to either ground or high voltage PUP. In this manner a starting binary counting value is input to the counters. The carry output RO of counter 338 is connected to the ENT input of counter 336. The QD output (CLKF) of counter 336 is the most significant bit of the the counter, and therefore the most significant bit of the 2-counter cascade. Signal CLKF is input to the load (_LD) inputs of both counters, which are enabled when CLKF is low. When the counter 336 passes the highest count value and reaches zero, the CLKF signal goes from high to low. This activates the _LD inputs of the counters 336, 338 and causes the reloading of the starting count value into the counters. Therefore, CLKF is low for one cycle of CLKOSC. In the preferred embodiment, the inputs to the counters are set to a starting value which results in the CLKF signal having a period which is 1/100 of the period of CLKOSC. Thus, in the preferred embodiment, signal CLKF is a signal which is low for 0.02 milliseconds and high for 1.98 milliseconds, a frequency of 500 Hz.

The signal CLKF is then divided further by cascaded 4-bit counters 340, 342, 344. Signal CLKF is input to the CLK input of each of the counters 340, 342, 344, and the counters are arranged in cascade form such that counter 340 represents the 4 most significant bits. When counter 340 counts out and returns to zero, the RO output of the counter 340 goes high and is input to NOR gate 346. This causes the output of the NOR gate 346 to go low. The NOR gate output is input to flip-flop array 348 which is clocked by CKF eliminating any glitches which may be present at the RO output of counter as well as synchronizing PWRISY from signal PWRINIT* and generating output LOADCNT* at the 1Q output of the D flip-flop 348. Signal LOADCNT* is from there input to the LD inputs of counters 340, 342, 344, and when it goes low it resets the counters by reloading the data from jumper arrays 350, 352, 354. The jumpers of the jumper arrays 350, 352, 354 set the starting count value of the counters 340, 342, 344, and therefore determine what the frequency of the signal at the RO output of counter 340 is relative to CLKF. In the preferred embodiment, the cascaded counters 340, 342, 344 divide the 500 Hz CLKF signal by 1000 to provide an output signal of 0.5 Hz. Thus, signal LOADCNT* is low for 0.002 seconds and high for 1.998 seconds giving a period of 2 seconds (0.5 Hz).

Buffer 356, shown in FIG. 12 is used for the buffering and driving of four different clock signals. The outputs of the buffer 356 are inverting outputs, so the signals at the "_Y" outputs of the buffer 356 are the inversion of the signals at the "A" inputs. Signal LOADCNT* is input to the A1 input of the buffer, and the resulting output, passed through series termination resistor 358 from output port _Y1, is signal CLKSY (used as a synchronizing clock signal for the synchronizer 192 of FIG. 7). Signal LOADCNT* is input to the 2D input of D flip-flop array 348. The 2Q output of the array 348 is therefore a version of LOADCNT* delayed one cycle of CLKF. The 2Q output is input to both the A2 and A3 outputs of buffer 356. Thus, the _Y2 and _Y3 outputs of the buffer 356 (RCLK and CCLK, respectively) represent an inverted form of the delayed LOADCNT* signal. Signal RCLK is therefore identical to signal CLK. However, as shown in FIG. 11, RCLK has an "off-the-board" connector, and is used elsewhere in the subring module circuit CLK, however, is used locally with the clock generation circuitry. RCLK is passed through series termination resistor 360 before going off the board. Signal CCLK is passed through series termination resistor 362. Signal LCLK* is generated from the inverted _2Q output of D flip-flop 348, which is an inverted version of CLK. Signal LCLK* is provided as an extra clock signal and can be used to drive an LED to display the system clock signal.

While the invention has been particularly shown and described with reference to a preferred embodiment thereof, it will be understood by those skilled in the art that various changes in form and details may be made therein without departing from the spirit and scope of the invention as defined by the appended claims. In particular, much of the present invention has been put forth with the recognition that control of a group of subrings could be accomplished by a central source such as a microprocessor. Although the system functions properly with each subring controlled by a separate state machine, in many places in the foregoing description, allotments are made for such centralized control in light of this possibility.

In many applications, the grouping of subrings in the system are such that several subring modules could be together in a single location. The subring modules for these subrings could then be located together in a single chassis. By providing a microprocessor or similar controlling device, the operation of the localized group of subring modules could be handled by the microprocessor. For example, the microprocessor could examine the down counters of the grouped subring modules, and manually switch the override switches of a subring which was recognized as having a problem. However, placing several subring modules under the control of a single microprocessor reduces fault tolerance by introducing more single point failure modes for the subring module group.

A microprocessor could also be used to replace the state machine of a single subring module, including all the counters. This would reduce the number of integrated circuits necessary for the subring module, thereby reducing the cost of fabrication. This would also simplify the changing of the count times for the different counters of the circuit.

In general, the functional achievements of the above circuitry could be accomplished using a number of different design modifications which do not substantially change the scope of the invention. In addition, the preferred embodiment has been presented with regard to a Hewlett-Packard/Apollo type token passing ring, but similar systems may be adapted to different token passing ring networks with certain design modifications.

An additional consideration when using the present invention is having a minimal amount of traffic on the network so that proper operation of the invention is ensured. In an HP-Apollo environment, switching a subring on or off the main network usually brings the network down for a short time. The network is brought back up when a node that desires to send something gives up waiting for a token (times out) and injects a token itself. The present invention considers the network down if it does not see a token coming by regularly. In an environment where there is no network traffic, the network stays down until a node attempts communication.

With the state machine of each subring of the present invention receiving a clock tick once every two seconds, it is necessary that the network come back up in less than about 5 seconds in order to ensure proper operation of the invention. A command which requests status information periodically can be run on at least one node of each subring to create enough traffic on the network to keep the present invention functioning properly. An example of such a command which may be used under the SYS5.3 operating system is as follows:

/etc/rtstat −n 1 −r 2 1>/dev/null 2>/dev/null &

This command requests status information every two seconds from the node with the unique identifier 1. It is assumed that this is not a real node on the network. The act of going out to look for it every two seconds creates enough traffic on the network to keep the present invention functioning properly. The command given above can be added to the /etc/rc file on at least one node of each subring.

The equations in the following table are those used in the preferred embodiment for the programming of PAL 194. The equations are in "abel" format, and can be used with a PAL20RS8 or a PAL22V10 type PAL.

TABLE 1

```
state0 :=
" if in state 0, stay there until either net down for several or not active
    state0 & syact & !down1    #
" from 6 to 0
    flag2 & flag1 & netup & syact    #
" to state 0 on reset or disable
    !syenable # reset;
abypsw :=
" from 0 to 1
    state0 & down1 & syenable & !reset    #
" from 6 to 7
    flag2 & flag1 & !netup & syenable & !reset    #
    flag2 & flag1 & !syact & syenable & !reset    #
" from 8 to 7
    encnt3 & down1 & syenable & !reset    #
```

TABLE 1-continued

```
    encnt3 & cnt3co & !netup & syenable & !reset;
arstsw :=
" from 2 to 4
    encnt2 & cnt2co & netup & syenable & !reset;
flag1 :=
" from 0 to 1
    state0 & down1 & syenable & !reset    #
" from 2 to 3
    encnt2 & cnt2co & !netup & syenable & !reset    #
" from 5 to 6
    flag2 & !flag1 & syenable & !reset;
flag2 :=
" from 4 to 5
    arstsw & syenable & !reset    #
" from 5 to 6
    flag2 & !flag1 & syenable & !reset;
encnt2 :=
" stay in state 2 until done wait
    encnt2 & !cnt2co & syenable & !reset    #
" from 0 to 2
    state0 & !down1 & !syact & syenable & !reset   #
" from 1 to 2
    abypsw & flag1 & syenable & !reset   #
" from 8 to 2
    encnt3 & cnt3co & netup & syenable & !reset;
encnt3 :=
" stay in state 8 until done wait or down1
    encnt3 & !cnt3co & !down1 & syenable & !reset   #
" from 3 to 8
    flag1 & !flag2 & !abypsw & syenable & !reset   #
" from 7 to 8
    abypsw & !flag1 & syenable & !reset;
dcbflg :=
" if set leave set unless in state 0
    dcbflg & !state0   #
" in state 3 so set flag
    flag1 & !flag2 & !abypsw   #
" if in state 6 and net down, so set
    flag2 & flag1 & !netup & syenable & !reset;
bmpdc =
" in state 3
    !dcbflg & flag1 & !flag2 & !abypsw   #
" if in state 6 and net down or inactive, bump if have not already
    flag2 & flag1 & !netup & !dcbflg & syenable & !reset   #
    flag2 & flag1 & !syact & !dcbflg & syenable & !reset;
```

I claim:

1. A token passing ring comprising:
    a main network providing a first serial communication path among a plurality of network nodes connected on the main network, said network nodes passing tokens along the first communication path to control communication traffic on the first communication path;
    a subring providing a second serial communication path among a plurality of subring nodes connected on the subring, said subring nodes passing tokens along the second communication path to control communication traffic on the second communication path;
    a subring module coupled to the subring and the main network and providing a switchable communication link between the subring and the main network, the subring module, in a first switch position, incorporating the second communication path into the first communication path, and the subring module, in a second switch position, closing each of the communication paths to form two isolated closed-circuit serial communication paths; and
    a controller coupled to the subring module, said controller having a data detection circuit coupled to the subring and detecting the tokens being passed at the subring module, the controller switching the subring module to the second switch position to isolate the subring from the main network upon detection of tokens at a frequency below a first threshold frequency and then switching the subring module back to the first switch position to reconnect the subring and the main network upon detection of tokens on the subring at a frequency above a second threshold frequency.

2. A token passing ring according to claim 1, wherein the controller further comprises a state machine which follows a preset program for controlling switching of the subring module in response to detection of tokens.

3. A token passing ring according to claim 2, wherein the state machine of the controller comprises a programmable array logic element in which the preset program is stored.

4. A token passing ring according to claim 1, further comprising an optical fiber link between the subring and network nodes on the main network.

5. A token passing ring according to claim 4, further comprising a signal converter between the subring and the optical fiber link for converting between optical and electrical signals.

6. A token passing ring according to claim 1, wherein said first switch position of the subring module connects an input port of the subring to an output port of the main network and an input port of the main network to an output port of the subring.

7. A token passing ring according to claim 1, wherein the second switch position of the subring module connects an input port of the subring to an output port of the subring and an input port of the main network to an output port of the main network.

8. A token passing ring according to claim 1, further comprising a manual switch for switching the subring module.

9. A token passing ring according to claim 8, wherein operation of the manual switch overides switching of the subring module by the controller.

10. A token passing ring according to claim 1, further comprising a display for displaying the switch position of the subring module.

11. An apparatus for controlling data communication between a first serial communication path and a second serial communication path, said first and second communication paths carrying periodically transmitted tokens for controlling communication traffic on the first and second communication paths, said apparatus comprising:
- a switchable communication link between the first communication path and the second communication path, the switchable link, in a first switch position, incorporating the second communication path into the first communication path, and the switchable link, in a second switch position, closing each of the first and second communication paths on themselves and isolating the first communication path from the second communication path; and
- a controller coupled to the switchable communication link, said controller having a data detection circuit coupled to the second communication path for detecting the tokens at the switchable communication link, the controller switching the communication link to the second switch position to isolate the second communication path from the first communication path upon detection of tokens at a frequency below a first threshold frequency and then switching the communication link back to the first switch position to reconnect the second communication path and the first communication path upon detection of tokens on the second communication path at a frequency above a second threshold frequency.

12. An apparatus according to claim 11 wherein if after the controller switches the communication link from the second switch position back to the first position the frequency at which the tokens are detected is below a third threshold frequency, the controller switches the communication link from the first switch position back to the second switch position.

13. An apparatus according to claim 12 wherein after the controller switches the communication link back to the second switch position, the controller waits a predetermined period of time before responding to subsequent token detections.

14. An apparatus according to claim 11, wherein the controller further comprises a state machine which follows a preset program for controlling switching of the communication link in response to detection of tokens.

15. An apparatus according to claim 14, wherein the state machine of the controller comprises a programmable array logic element.

16. An apparatus according to claim 11, wherein said first switch position connects an input port of the first serial communication path to an output port of the second serial communication path, and connects an output port of the first serial communication path to an input port of the second serial communication path.

17. An apparatus according to claim 11, wherein said second switch position connects an input port of the first serial communication path to an output port of the first serial communication path, and connects an input port of the second serial communication path to an output port of the second serial communication path.

18. On a token passing ring network, a method of controlling the interconnection of a main network and a subring, the main network providing a first serial communication path among a plurality of network nodes connected on the main network and the subring providing a second serial communication path among a plurality of subring nodes connected on the subring, the network nodes and the subring nodes passing tokens along the communication paths to control communication traffic on the communication paths, the method comprising:
- providing a subring module coupled to the subring and the main network and acting as a switchable link between the subring and the main network, the subring module, in a first switch position, incorporating the second communication path into the first communication path, and the subring module, in a second switch position, isolating the subring from the main network and closing each of the communication paths on themselves; and
- controlling the switching of the subring module with a controller coupled to the subring module and having a data detection circuit coupled to the subring for detecting tokens at the subring module, the controller switching the subring module to the second switch position to isolate the subring from the main network upon detection of tokens at a frequency below a first threshold frequency and then switching the subring module back to the first switch position to reconnect the subring and the main network upon detection of tokens on the subring at a frequency above a second threshold frequency.

19. A method according to claim 18 wherein if after the controller switches the subring module back to the first switch position the frequency at which the tokens are detected is below a third threshold frequency, the controller switches the subring module from the first switch position back to the second switch position.

20. A method according to claim 19 wherein after the controller switches the subring module back to the second switch position, the controller waits a predetermined period of time before responding to subsequent token detections.

21. A method according to claim 18, wherein the controller comprises a state machine which follows a preset program which responds to detection of tokens.

22. A method of controlling the switching of a subring into and out of the main network of a token passing ring, the method comprising:
- detecting tokens on the subring with a controller coupled to the subring and having a data detection circuit;
- switching the subring out of the network if the frequency at which the tokens are detected is below a required lower threshold frequency for a first predetermined period of time;
- waiting a second predetermined period of time;
- switching the subring back into the network at the end of the second predetermined period of time if a required upper threshold frequency of tokens are detected after the second predetermined period of time;

switching the subring back out of the network if the frequency at which the tokens are detected is below the required lower threshold frequency after the subring is switched back into the network, and waiting a third predetermined period of time before responding to subsequent token detections; and switching the subring back into the network if after the third predetermined period of time the required upper threshold frequency of tokens is detected.

23. A network comprising:
a first subnetwork having a first communication path on which signals propagate;
a second subnetwork having a second communication path on which signals propagate; and
a switchable communication link between the first and second subnetworks, said switchable communication link comprising:
  a switch switchable between a first switch position and a second switch position, in the first switch position, the switch connecting the first and second subnetworks such that signals of the first subnetwork and signals of the second subnetwork propagate on the first and second communication paths and, in the second switch position, the switch isolating the subnetworks from each other such that signals of the first subnetwork propagate on only the first communication path and signals of the second subnetwork propagate on only the second communication path,
  a detection circuit coupled to the second subnetwork for detecting periodic token signals which propagate on the second communication path to determine the integrity of the second subnetwork when the switch is in the second switch position and the integrity of the first and second subnetworks when the switch is in the first switch position; and
  a control circuit coupled to the switch and the detection circuit, said control circuit switching the switch to the second switch position to isolate the first and second subnetworks upon detection of periodic token signals at a frequency below a first threshold frequency and then switching the switch back to the first switch position to reconnect the first and second subnetworks upon detection of periodic token signals on the second subnetwork at a frequency above a second threshold frequency.

24. An interface module for providing a switchable communication link between a first subnetwork and a second subnetwork of a main network, the first subnetwork having a first communication path on which signals propagate and the second subnetwork having a second communication path on which signals propagate, said interface module comprising:
  a switch switchable between a first switch position and a second switch position, in the first switch position, the switch connecting the first and second subnetworks such that signals of the first subnetwork and signals of the second subnetwork propagate on the first and second communication paths and, in the second switch position, the switch isolating the subnetworks from each other such that signals of the first subnetwork propagate on only the first communication path and signals of the second subnetwork propagate on only the second communication path,
  a detection circuit coupled to the second subnetwork for detecting periodic token signals which propagate on the second communication path to determine the integrity of the second subnetwork when the switch is in the second switch position and the integrity of the first and second subnetworks when the switch is in the first switch position; and
  a control circuit coupled to the switch and the detection circuit, said control circuit switching the switch to the second switch position to isolate the first and second subnetworks upon detection of periodic token signals at a frequency below a first threshold frequency and then switching the switch back to the first switch position to reconnect the first and second subnetworks upon detection of periodic token signals on the second subnetwork at a frequency above a second threshold frequency.

25. A method of interfacing a first subnetwork and a second subnetwork of a main network, the first subnetwork having a first communication path on which signals propagate and the second subnetwork having a second communication path on which signals propagate, said method comprising the steps of:
  providing a switchable communication link between the first and second subnetworks, said switchable communication link being switchable between a first position and a second position, in the first position, the switchable link connecting the first and second subnetworks such that signals of the first subnetwork and signals of the second subnetwork propagate on the first and second communication paths and, in the second position, the switchable link isolating the subnetworks from each other such that signals of the first subnetwork propagate on only the first communication path and signals of the second subnetwork propagate on only the second communication path;
  detecting periodic token signals which propagate on the second communication path to determine the integrity of the second subnetwork when the switch is in the second switch position and the integrity of the first and second subnetworks when the switch is in the first switch position; and
  switching the switchable link to the second position to isolate the first and second subnetworks upon detection of periodic token signals at a frequency below a first threshold frequency and then switching the switchable link back to the first position to reconnect the first and second subnetworks upon detection of periodic token signals on the second subnetwork at a frequency above a second threshold frequency.

* * * * *